(12) United States Patent
Takeuchi et al.

(10) Patent No.: US 7,779,647 B2
(45) Date of Patent: Aug. 24, 2010

(54) EJECTOR AND EJECTOR CYCLE DEVICE

(75) Inventors: Hirotsugu Takeuchi, Nagoya (JP); Mika Saito, Kariya (JP); Hiroshi Oshitani, Toyota (JP); Shin Nishida, Anjo (JP); Takayuki Sugiura, Anjo (JP)

(73) Assignee: Denso Corporation, Kariya (JP)

( * ) Notice: Subject to any disclaimer, the term of this patent is extended or adjusted under 35 U.S.C. 154(b) by 862 days.

(21) Appl. No.: 11/439,415

(22) Filed: May 23, 2006

(65) Prior Publication Data

US 2006/0266072 A1 Nov. 30, 2006

(30) Foreign Application Priority Data

| May 24, 2005 | (JP) | 2005-151590 |
| May 24, 2005 | (JP) | 2005-151591 |
| Jul. 4, 2005 | (JP) | 2005-195537 |
| Jul. 20, 2005 | (JP) | 2005-210151 |
| Jul. 22, 2005 | (JP) | 2005-213273 |

(51) Int. Cl.
*F25B 1/06* (2006.01)

(52) U.S. Cl. ............... 62/500; 62/191; 62/268; 417/151

(58) Field of Classification Search ............ 62/500, 62/498, 191, 268, 269, 270; 417/151
See application file for complete search history.

(56) References Cited

U.S. PATENT DOCUMENTS

| 4,250,721 | A | 2/1981 | Wilmers et al. |
| 6,360,552 | B1 * | 3/2002 | Lee et al. .................. 62/200 |
| 6,477,857 | B2 * | 11/2002 | Takeuchi et al. .......... 62/500 |
| 6,550,265 | B2 | 4/2003 | Takeuchi et al. |
| 6,574,987 | B2 | 6/2003 | Takeuchi et al. |
| 6,729,149 | B2 | 5/2004 | Takeuchi |
| 6,799,435 | B2 * | 10/2004 | Saito et al. ................ 62/500 |
| 6,871,506 | B2 * | 3/2005 | Takeuchi et al. .......... 62/170 |
| 6,920,922 | B2 | 7/2005 | Takeuchi |
| 2004/0079102 | A1 | 4/2004 | Umebayashi et al. |

(Continued)

FOREIGN PATENT DOCUMENTS

EP 1498671 A1 * 1/2005

(Continued)

OTHER PUBLICATIONS

U.S. Appl. No. 11/501,557, filed Aug. 9, 2006, Nishijima et al.

(Continued)

*Primary Examiner*—Cheryl J Tyler
*Assistant Examiner*—Justin Loffredo
(74) *Attorney, Agent, or Firm*—Harness, Dickey & Pierce, PLC

(57) ABSTRACT

An ejector cycle device includes a compressor that draws and compresses refrigerant, a radiator that radiates heat of high-pressure refrigerant discharged from the compressor, an ejector, a branch passage branched from a refrigerant passage between the radiator and a nozzle portion of the ejector and coupled to a suction port of the ejector, a throttle unit that is arranged in the branch passage and decompresses refrigerant, and an evaporator that is arranged on a downstream side of refrigerant flow of the throttle unit in the branch passage and evaporates refrigerant. Accordingly, even when a suction performance of the ejector is lowered, refrigerant can flow through the evaporator.

21 Claims, 16 Drawing Sheets

U.S. PATENT DOCUMENTS

| | | |
|---|---|---|
| 2005/0011221 A1 | 1/2005 | Hirota |
| 2005/0178150 A1* | 8/2005 | Oshitani et al. ............... 62/500 |
| 2005/0268644 A1 | 12/2005 | Oshitani et al. |

FOREIGN PATENT DOCUMENTS

| | | |
|---|---|---|
| JP | 52-036534 | 3/1977 |
| JP | 52-140046 | 11/1977 |
| JP | 01-155149 | 6/1989 |
| JP | 03-005674 | 1/1991 |
| JP | 05-312421 | 11/1993 |
| JP | 06-018121 | 1/1994 |
| JP | 06-109338 | 4/1994 |
| JP | 08-166172 | 6/1996 |
| JP | 2001-153473 A | 6/2001 |
| JP | 2002-310584 A | 10/2002 |
| JP | 2003-279177 | 10/2003 |
| JP | 2003-294328 A | 10/2003 |
| JP | 2003-320838 A | 11/2003 |
| JP | 2004-108683 | 4/2004 |
| JP | 2004-212019 | 7/2004 |
| JP | 2004-257694 | 9/2004 |

OTHER PUBLICATIONS

U.S. Appl. No. 11/503,895, filed Aug. 14, 2006, Takeuchi et al.

Office Action dated Feb. 21, 2008 in Korean Application No. 10-2006-0046735 with English translation thereof.

Preliminary Rejection dated Sep. 9, 2008 from the Korean Patent Office in the corresponding divisional patent application No. 10-2007-0108568 with English translation.

Office Action dated Aug. 31, 2007 in Chinese Application No. 2006 1008 4443.9 with English translation thereof.

Office Action issued in the corresponding Chinese patent application No. 2008 1009 0020.7 dated May 8, 2009 with English translation.

Office Action dated Apr. 24, 2009 in Korean Application No. 10-2007-0108568.

Office Action dated Feb. 23, 2010 from the Japan Patent Office in the corresponding patent application No. 2005-213273 with English translation.

Office Action dated Apr. 13, 2010 in Japanese Application No. 2005-195537.

* cited by examiner

US 7,779,647 B2

EJECTOR AND EJECTOR CYCLE DEVICE

CROSS REFERENCE TO RELATED APPLICATION

This application is based on Japanese Patent Applications No. 2005-151590 filed on May 24, 2005, No. 2005-151591 filed on May 24, 2005, No. 2005-195537 filed on Jul. 4, 2005, No. 2005-210151 filed on Jul. 20, 2005, and No. 2005-213273 filed on Jul. 22, 2005, the contents of which are incorporated herein by reference in its entirety.

BACKGROUND OF THE INVENTION

1. Field of the Invention

The present invention relates to an ejector and an ejector cycle device using the same. The ejector cycle device can be suitably used for a vapor compression type refrigerating cycle using an ejector.

2. Description of the Related Art

As for a vapor compression type refrigerating cycle using an ejector, there is proposed a vapor compression type refrigerating cycle as described, for example, in JP-B1-3322263 (corresponding to U.S. Pat. Nos. 6,477,857, 6,574,987) that employs a vapor/liquid separator and an ejector for flowing only liquid-phase refrigerant into an evaporator. Moreover, JP-A-2005-37093 (corresponding to US 2005/0011221A1) proposes a vapor compression type refrigerating cycle including a differential pressure valve that is located between a vapor/liquid separator and an evaporator and has a differential pressure between before and after itself controlled nearly proportionally to a differential pressure between before and after an ejector, and a check valve that is arranged in series with this differential pressure valve and allows refrigerant to flow only in a direction in which refrigerant flows from the liquid refrigerant outlet of the vapor/liquid separator.

However, one of problems of the vapor compression type refrigerating cycle using the above-mentioned conventional ejector is that when the performance of an ejector is degraded, in particular, in the case of low outside air temperature, the amount of refrigerant flowing through an evaporator decreases to degrade the performance of the evaporator. For this reason, it is demanded to provide a cycle construction in which even when the performance of the ejector is degraded, refrigerant flows through the evaporator.

Moreover, a vapor compression type heat pump cycle in which heat on a low temperature side is transferred to a high temperature side by the use of an ejector is described in U.S. Pat. No. 6,550,265. Here, an ejector type heat pump cycle is provided to switch two heat exchangers between the high temperature side and the low temperature side by the use of two four-way valves.

However, the heat pump cycle constructed of two four-way valves increases cost and also decreases the ease with which it is mounted.

Moreover, there has been known an ejector cycle device in which a nozzle portion of an ejector and a pressure reducing means separate from the nozzle portion are integrated with each other, thereby being reduced in size (e.g., JP-A-2004-44906 corresponding to U.S. Pat. No. 6,871,506).

In the cycle disclosed in JP-A-2004-44906, an ejector with which a variable throttle is integrated is connected to the downstream side of a radiator, an accumulator is connected to the downstream side of the ejector, the liquid-phase refrigerant outlet of the accumulator is connected to the inlet of an evaporator, and the outlet of the evaporator is connected to the refrigerant suction port of the ejector. Therefore, the amount of refrigerant drawn by the evaporator depends only on the suction capacity of the ejector. For this reason, when the difference between high pressure and low pressure of the cycle becomes small and hence the input of the ejector decreases, the suction capacity of the ejector decreases, and the flow rate of refrigerant of the evaporator decreases. In this case, the evaporator cannot fully exert a cooling capacity.

SUMMARY OF THE INVENTION

In view of the foregoing problems, it is an object of the present invention to provide an ejector cycle device having an ejector, in which refrigerant flows into an evaporator even when an ejector suction performance is lowered.

It is another object of the present invention to provide an ejector cycle device having an ejector, which can switch a high temperature side and a low temperature side in a refrigerant cycle with a simple structure.

It is further another object of the present invention to provide an ejector cycle device capable of reducing cost and switching between a high temperature side and a low temperature side.

It is further another object of the present invention to provide an ejector and an ejector cycle device using the same, having a simple branch passage structure.

It is further another object of the present invention to provide an ejector integrated with a throttle unit with a simple structure.

According to an aspect of the present invention, an ejector cycle device includes: a compressor that draws and compresses refrigerant; a radiator that radiates heat of high-pressure refrigerant discharged from the compressor; an ejector which includes a nozzle portion converting a pressure energy of high-pressure refrigerant on a downstream side of the radiator to a velocity energy to decompress and expand refrigerant, and a suction port for drawing refrigerant by a jet flow from the nozzle portion; a branch passage branched from a refrigerant passage between the radiator and the nozzle portion of the ejector, and coupled to the suction port of the ejector; a throttle unit (throttle means) that is arranged in the branch passage and decompresses refrigerant; and an evaporator that is arranged on a downstream side of refrigerant flow of the throttle unit in the branch passage and evaporates refrigerant. Accordingly, even when the ejector suction capacity is lowered at a low outside air temperature, it is possible to introduce refrigerant into the evaporator, and cooling capacity of the evaporator can be maintained.

For example, a flow control unit can be arranged in the refrigerant passage between the radiator and the ejector, and controls a flow rate of refrigerant. In this case, the flow rate of refrigerant in the whole cycle can be easily adjusted.

A vapor/liquid separator can be located between an outlet of the ejector and the compressor, to separate refrigerant into vapor-phase refrigerant and liquid-phase refrigerant so as to supply the vapor-phase refrigerant to the compressor and to accumulate the liquid-phase refrigerant. Furthermore, a heat recovery unit can be located between the ejector and the compressor to exchange heat between refrigerant flowing out of the radiator and refrigerant flowing out of the ejector and drawn by the compressor. Alternatively, a heat recovery unit can be located between the vapor/liquid separator and the compressor to exchange heat between refrigerant flowing out of the radiator and refrigerant flowing out of the vapor/liquid separator and drawn by the compressor. Alternatively, a heat recovery unit can be located between the ejector and the vapor/liquid separator to exchange heat between refrigerant flowing out of the radiator and refrigerant flowing out of the ejector and flowing into the vapor/liquid separator. Accordingly, heat can be effectively recovered using the heat recovery unit.

Furthermore, a plurality of heat recovery members can be located between the ejector and the compressor and exchange heat between refrigerant flowing out of the radiator and refrigerant flowing out of the ejector and drawn by the compressor. In this case, the vapor/liquid separator can be located between a plurality of low-pressure refrigerant passages of the heat recovery members.

In the ejector cycle device, a liquid refrigerant supply passage can be disposed to draw liquid-phase refrigerant from the vapor/liquid separator, and a non-return means can be arranged in the liquid refrigerant supply passage to allow a refrigerant flow in a direction flowing out of the vapor/liquid separator. In this case, the liquid-phase refrigerant supplied from the liquid refrigerant supply passage can be made to flow into an upstream side of refrigerant flow of the evaporator.

According to another aspect of the present invention, an ejector cycle device includes: a compressor that draws, compresses and discharges refrigerant; an ejector that is arranged in a refrigerant circulating passage through which refrigerant is circulated by the compressor, wherein the ejector has a nozzle portion having an inlet for introducing a high-pressure refrigerant before being decompressed, a suction port from which refrigerant is drawn by a jet flow of refrigerant from the nozzle portion, and a discharge port for discharging refrigerant from the nozzle and the suction port; a branch passage coupled to the inlet of the ejector and the suction port of the ejector; a heat exchanger that is arranged in the branch passage; and a passage switching unit that switches between a first mode in which the high-pressure refrigerant is supplied to the inlet of the ejector and refrigerant flows from the heat exchanger to the suction port, and a second mode in which the high-pressure refrigerant is supplied to the discharge port and refrigerant flows from the suction port of the ejector to the heat exchanger. Accordingly, a high temperature side and a low temperature side can be switched with a simple structure in the cycle.

The heat exchanger can be arranged as a first heat exchanger. In this case, a throttle unit can be located between the inlet of the ejector and the first heat exchanger and brings the first heat exchanger to a low temperature in the first mode and brings the first heat exchanger to a high temperature in the second mode. Furthermore, a second heat exchanger can be arranged in the refrigerant circulating passage and is brought to a high temperature in the first mode and is brought to a low temperature in the second mode.

Even in this case, a heat recovery unit can be located between the ejector and the compressor and exchanges heat in the first mode between refrigerant flowing out of the second heat exchanger and refrigerant flowing out of the ejector and drawn by the compressor.

Furthermore, a second ejector and a second branch passage can be arranged on a side of the second heat exchanger. In this case, the second ejector has an inlet through which high-pressure refrigerant on a downstream side of the first heat exchanger flows in at the time of the second mode, the second branch passage introduces a refrigerant flow branched from the refrigerant circulating passage on an upstream side of the inlet of the first ejector into a suction port of the second ejector, and the second heat exchanger can be arranged in the second branch passage and evaporates refrigerant to thereby exert a cooling capacity in the second mode.

According to further another object of the present invention, an ejector for a refrigerant cycle includes: a nozzle portion that reduces pressure of refrigerant to thereby expand the refrigerant; a suction portion into which refrigerant is drawn by high-velocity refrigerant jetted from the nozzle portion; a diffuser portion for mixing and pressurizing the refrigerant jet from the nozzle portion and the refrigerant drawn from the suction portion; a first connection portion that communicates with an upstream side of the nozzle portion; a second connection portion that communicates with a downstream side of the diffuser portion; a third connection portion that communicates with the suction portion; and a fourth connection portion that communicates with an upstream side of the nozzle portion. Accordingly, the branched refrigerant passages of the ejector can be made simple. Furthermore, it is possible to simply form fifth and sixth connection portions, similarly to the fourth connection portion.

For example, a control mechanism can be made to control an opening of the nozzle portion. Alternatively, the control mechanism can be disposed to control an opening of a refrigerant passage passing through the fourth connection portion.

Furthermore, the control mechanism can be provided with a needle arranged in a refrigerant passage of the nozzle portion, and one end of the refrigerant passage passing through the fourth connection portion can be open opposite to a side surface of the needle in the refrigerant passage of the nozzle portion. Alternatively, a throttle means can be provided to throttle a refrigerant flow flowing through the fourth connection portion. For example, the throttle means can be located between the fourth connection portion and the first connection portion, or can be arranged in a refrigerant passage connected to the fourth connection portion.

According to further another object of the present invention, an ejector for a refrigerant cycle having an evaporator, includes: an ejector part having a nozzle portion that decompresses and expands refrigerant, and a suction portion through which refrigerant from the evaporator is drawn by high-velocity refrigerant jetted from the nozzle; and a throttle unit that is integrated with the ejector and reduces pressure of refrigerant branched on an upstream side of the nozzle portion and flowing out to an upstream side of the evaporator. Therefore, an integrated structure of an ejector with a throttle mean (e.g., throttle unit) can be provided.

In this case, at least one of the nozzle portion and the throttle unit can be constructed to change an area of a refrigerant passage. Furthermore, the throttle unit can be housed in a housing that houses the nozzle portion.

Furthermore, the nozzle portion may be a variable nozzle portion capable of changing an area of a refrigerant passage, the throttle unit may be a variable throttle mechanism capable of changing an area of a refrigerant passage, and the area of the refrigerant passage of the variable nozzle portion and the area of the refrigerant passage of the variable throttle mechanism may be changed by a common passage area control means. In this case, the passage area control means contracts or enlarges the area of the refrigerant passage of the variable nozzle portion and the area of the refrigerant passage of the variable throttle mechanism at the same time.

Alternatively, the throttle unit can be arranged outside a housing for housing the nozzle portion, and the throttle unit can be integrally coupled to the housing by a refrigerant pipe having a length of about 5 cm or less. Furthermore, the variable nozzle portion and the variable throttle mechanism can be controlled by a single driving part.

According to a further another object of the present invention, an ejector cycle device includes: an ejector that includes a nozzle portion which reduces pressure of refrigerant to thereby expand the refrigerant, and draws refrigerant by high-velocity refrigerant jetted from the nozzle portion; an evaporator that evaporates refrigerant branched on an upstream side of the nozzle portion and drawn by the ejector; and a throttle means that reduces pressure of refrigerant branched on an upstream side of the nozzle portion to thereby expand the refrigerant and supplies the refrigerant to the evaporator. In this case, the throttle means is integrated with the ejector. Therefore, the structure of the ejector cycle device can be made simple.

BRIEF DESCRIPTION OF THE DRAWINGS

Additional objects and advantages of the present invention will be more readily apparent from the following detailed description of preferred embodiments when taken together with the accompanying drawings.

DETAILED DESCRIPTION OF THE PREFERRED EMBODIMENTS

1st Embodiment

Figure 1:
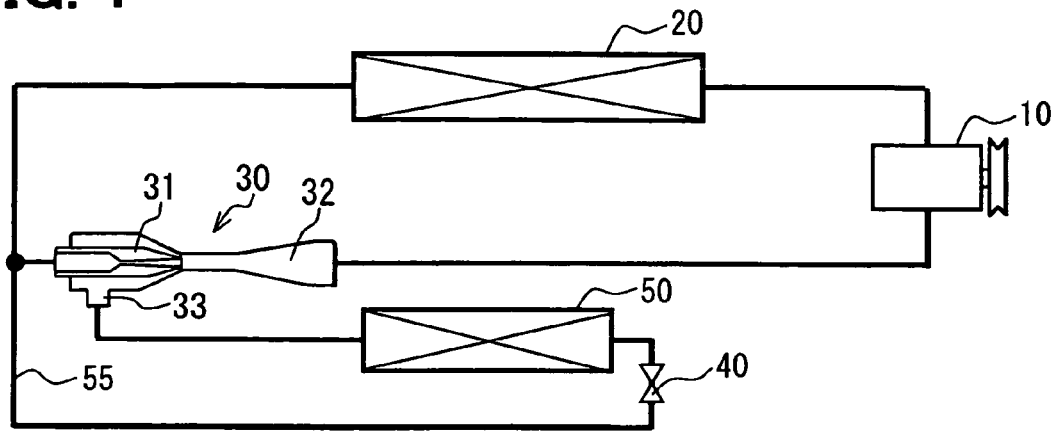
FIG. 1 is a schematic diagram of a vapor compression type refrigerating cycle (ejector cycle device) using an ejector in a 1st embodiment of the present invention.

Hereinafter, the 1st embodiment of the present invention will be described in detail by the use of FIG. 1. FIG. 1 is a schematic diagram of a vapor compression type refrigerating cycle (ejector cycle device) using an ejector in accordance with the 1st embodiment of the present invention. In this embodiment, the vapor compression type refrigerating cycle using an ejector in accordance with the present invention is typically used for such an air conditioner for a vehicle that uses carbon dioxide ($CO_2$) as refrigerant.

A compressor 10 is supplied with a driving force from a driving source such as a driving engine (not shown) and draws and compresses refrigerant. As the compressor 10 in this embodiment is employed a variable displacement compressor that variably controls the flow rate of discharge refrigerant (discharge refrigerant rate) in such a way that the temperature of refrigerant drawn by the compressor 10 becomes a specified temperature. The flow rate of discharge refrigerant (discharge refrigerant rate) is controlled by an electronic control unit (not shown). A radiator 20 is a high-pressure side heat exchanger that exchanges heat between refrigerant discharged from the compressor 10 and air outside a vehicle compartment, which is blown off from a blower (not shown) to thereby cool the refrigerant.

An ejector 30 reduces the pressure of refrigerant flowing out of the radiator 20 to thereby expand the refrigerant and draws vapor-phase refrigerant evaporating in an evaporator 50, which will be described later, from a suction portion 33 and converts expansion energy to pressure energy to thereby increase the suction pressure of the compressor 10. Refrigerant flowing out of this ejector 30 is drawn by the compressor 10. In this manner, a refrigerant circulating passage of the ejector cycle device is formed.

In this refrigerant circulating passage, a branch point of a branch passage 55 that introduces branched refrigerant flow into the above-mentioned suction portion 33 of the ejector 30 is located between the radiator 30 and a nozzle 31, which will be described later, of the ejector 30. In this branch passage is arranged the evaporator 50 as a low-pressure side heat exchanger that exchanges heat between air to be blown into a vehicle compartment and liquid-phase refrigerant to evaporate the liquid-phase refrigerant to thereby exert a cooling capacity.

Moreover, on the upstream side of refrigerant flow of this evaporator 50, there is arranged a throttle unit 40 (in this embodiment, a fixed throttle such as a capillary tube) that reduces the pressure of refrigerant drawn by the evaporator 50 to thereby surely reduce pressure (evaporation pressure) in the evaporator 50 and controls the flow rate of refrigerant flowing into the evaporator 50.

Here, the ejector 30, as shown in FIG. 1, is constructed of: the nozzle 31 that converts the pressure energy of high-pressure refrigerant flowing out of the radiator 20 to velocity energy (velocity head) to reduce the pressure of refrigerant to thereby expand the refrigerant; the suction portion 33 that draws vapor-phase refrigerant evaporated in the evaporator 50; a mixing portion that draws refrigerant from the suction portion 33 by a high-velocity refrigerant flow (jet flow) jetted from the nozzle 31 and at the same time mixes refrigerant jetted from the nozzle 31 with refrigerant drawn from the evaporator 50; and a diffuser portion that converts the velocity energy of refrigerant flowing out of the mixing portion to pressure energy to thereby increase the pressure of refrigerant.

Moreover, the tip side of the suction portion 33 is formed in a conical tapered shape in which the cross-sectional area of a passage gradually decreases as the passage is closer to the mixing portion. The diffuser portion is formed in a conical tapered shape in which the cross-sectional area of a passage gradually increases as the passage is closer to the refrigerant outlet.

Next, the operation of the vapor compression type refrigerating cycle using the above-mentioned construction will be described. When the compressor 10 is driven, vapor-phase refrigerant is drawn from the suction side by the compressor 10 and compressed refrigerant is discharged to the radiator 20. Refrigerant cooled by the radiator 20 is divided into an ejector passage driving flow flowing into the nozzle 31 of the ejector 30 and the branch passage having suction flow passing through the throttle unit 40 and the evaporator 50.

Refrigerant flowing into the nozzle 31 has its pressure reduced to expand and draws refrigerant in the evaporator 50. The refrigerant of a suction flow drawn from the evaporator 50 is mixed with the refrigerant of the driving flow jetted from the nozzle 31 in the mixing portion. The mixed refrigerant has its dynamic pressure converted to static pressure by the diffuser portion and then returns to the compressor 10. On the other hand, the refrigerant of the suction flow has its pressure reduced by the throttle unit 40 (throttle means) and then flows into the evaporator 50 and then absorbs heat from air to be blown into the vehicle compartment to evaporate and then is drawn by the ejector 30.

At this time, in the mixing portion, the driving flow is mixed with the suction flow in such a way that the sum of the momentum of the driving flow and the momentum of the suction flow is conserved. Hence, the pressure (static pressure) of refrigerant increases also in the mixing portion. In contrast, in the diffuser portion, as described above, the cross-sectional area of the passage gradually increases and hence the velocity energy (dynamic pressure) of refrigerant is converted to pressure energy (static pressure). Hence, in the ejector 30, the pressure of refrigerant is increased both in the mixing portion and in the diffuser portion.

The mixing portion and the diffuser portion are generically named a pressure increasing portion 32. In other words, in an ideal ejector 30, the pressure of refrigerant increases in the mixing portion in such a way that the sum of the momentum of the driving flow and the momentum of the suction flow is conserved and increases in the diffuser portion in such a way that energy is conserved.

Next, the features and effects of this embodiment will be described. The ejector cycle device of this embodiment includes: the compressor 10 that draws and compresses refrigerant; the radiator 20 that radiates the heat of high-pressure refrigerant discharged from the compressor 10; the ejector 30 that converts the pressure energy of high-pressure refrigerant on the downstream side of the radiator 20 to the velocity energy to reduce the pressure of the refrigerant to thereby expand the refrigerant and draws refrigerant; the branch passage 55 that introduces a refrigerant flow branched from the branch point between the radiator 20 and the ejector 30 of a refrigerant circulating passage, which includes the compressor 10, the radiator 20, and the ejector 30 and in which refrigerant is circulated, and causes the ejector 30 to suck the refrigerant; the throttle unit 40 that is arranged in the branch passage 55 and reduces the pressure of refrigerant flow; and the evaporator 50 that is arranged on the downstream side of refrigerant flow of the throttle unit 40 in the branch passage 55 and evaporates refrigerant to thereby exert a cooling capacity.

According to this embodiment, on the upstream side of the ejector 30, the refrigerant flow is divided into the driving flow flowing into the ejector 30 as refrigerant circulating passage and the suction flow flowing into the evaporator 50 as the branch passage 55. Hence, even when the suction performance of the ejector 30 is reduced due to a low outside air temperature, there is realized a vapor compression type refrigerating cycle using the ejector in which refrigerant flows through the evaporator 50.

Moreover, pressure at the outlet of the ejector 30 becomes higher than the pressure of the evaporator 50 by an increased pressure due to the pressure increasing action of ejector 30 and hence the suction pressure of the compressor 10 is also higher than pressure at the outlet of the evaporator 50. In other words, even when the above-mentioned simple cycle construction with the ejector 30 is used, a refrigerating capacity can be effectively increased and the suction pressure of the compressor 10 can be effectively increased by an increase in enthalpy difference while the evaporator 50 is held kept at a low pressure and a low temperature. Hence, it is possible to suitably decrease compression power and to enhance COP in the vapor compression type refrigerating cycle using the ejector 30 with a simple structure.

2nd Embodiment

Figure 2:
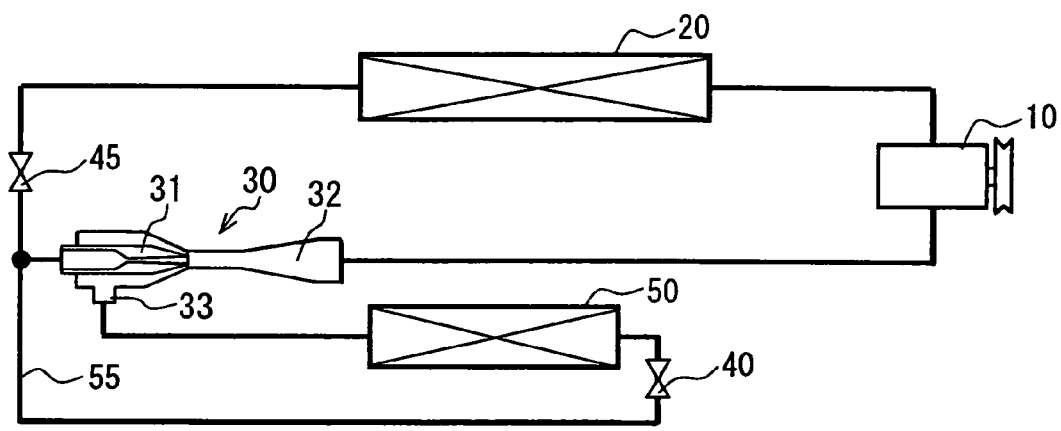
FIG. 2 is a schematic diagram of a vapor compression type refrigerating cycle using an ejector in a 2nd embodiment of the present invention.

FIG. 2 is a schematic diagram of a vapor compression type refrigerating cycle (ejector cycle device) using an ejector in accordance with the 2nd embodiment of the present invention. Features in which the 2nd embodiment is different from the 1st embodiment will be mainly described. In this embodiment, a flow control valve 45 as flow controlling means for controlling the flow rate of refrigerant is arranged in a refrigerant circulating passage between the radiator 20, and the nozzle portion 31 and the branch passage 55.

In the basic cycle construction of the 1st embodiment, even when a variable flow type ejector is used as the ejector 30 so as to control the flow rate of refrigerant, when the flow rate of the driving flow is decreased, the flow rate of the suction flow is increased so that the total flow rate of refrigerant flowing through the compressor 10 is not much varied. In this case, the flow rate of refrigerant may be not controlled as much as we expect.

In the ejector cycle device of the second embodiment, it is possible to easily control the total flow rate of refrigerant without changing the ratio of flow rate between the driving flow and the suction flow by arranging the flow control valve 45 on the upstream side of the branch point of the branch passage 55. In this embodiment, the flow control valve 45 may be an electric flow control valve 45 capable of variably controlling the flow rate of refrigerant and may be a fixed flow control unit (fixed flow control means).

3rd Embodiment

Figure 3:
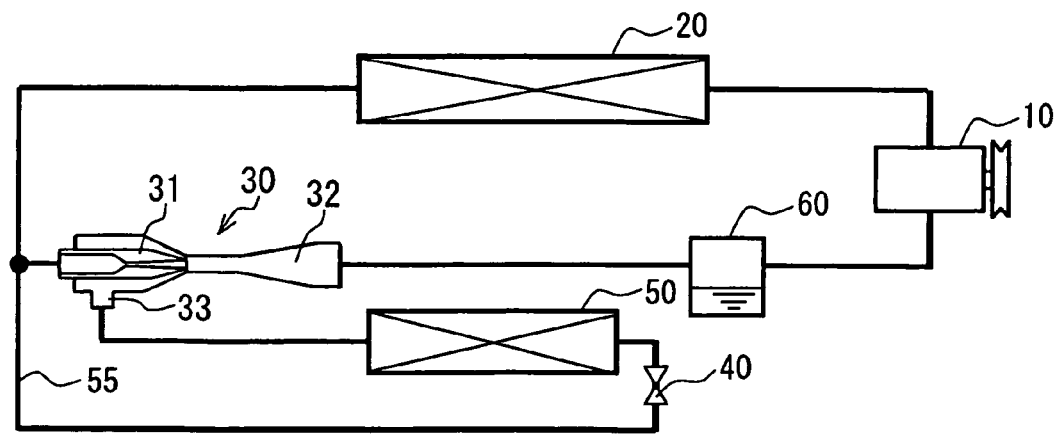
FIG. 3 is a schematic diagram of a vapor compression type refrigerating cycle using an ejector in a 3rd embodiment of the present invention.

FIG. 3 is a schematic diagram of a vapor compression type refrigerating cycle using an ejector 30 in accordance with the 3rd embodiment of the present invention. Features in which the 3rd embodiment is different from the above-mentioned respective embodiments will be mainly described. In this embodiment, a vapor/liquid separator 60 that separates circulating refrigerant into vapor-phase refrigerant and liquid-phase refrigerant and supplies only the vapor-phase refrigerant to the compressor 10 and accumulates the liquid-phase refrigerant is located between the outlet of the ejector 30 and the compressor 10.

The vapor/liquid separator 60 in FIG. 3 is an accumulator into which refrigerant flowing out of the ejector 30 flows and which separates the flowing-in refrigerant into vapor-phase refrigerant and liquid-phase refrigerant and accumulates the liquid-phase refrigerant. The separated vapor-phase refrigerant is drawn by the compressor 10 and the separated liquid-phase refrigerant is accumulated in the vapor/liquid separator 60. When the vapor/liquid separator 60 is arranged in the basic cycle construction of the 1st embodiment, the vapor/liquid separator 60 is used as an accumulator for separating refrigerant into vapor and liquid and for accumulating the separated liquid-phase refrigerant.

Hence, according to this embodiment, it is possible to prevent liquid-phase refrigerant from being returned to and compressed by the compressor 10 and further to control the amount of refrigerant circulating in the cycle to an appropriate amount. Moreover, piping for flowing out liquid-phase refrigerant into the evaporator 50, as shown in the above-mentioned JP-3322263, is not necessary and hence a usual vapor/liquid separator 60 having such piping or a tank can be used, which results in reducing cost. In the third embodiment, when the return of liquid-phase refrigerant to the compressor 10 is not a problem, it is also recommendable to use construction having no vapor/liquid separator 60, just as with the 1st embodiment.

4th Embodiment

Figure 4:
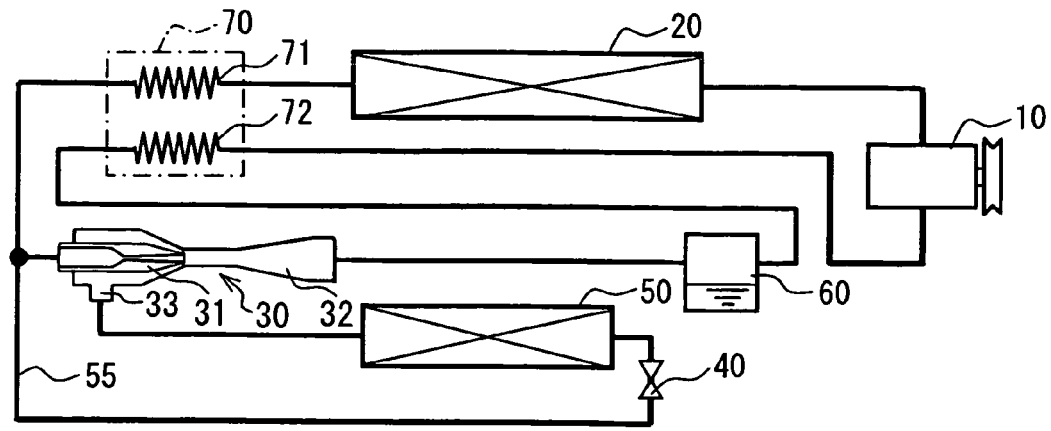
FIG. 4 is a schematic diagram of a vapor compression type refrigerating cycle using an ejector in a 4th embodiment of the present invention.

FIG. 4 is a schematic diagram of a vapor compression type refrigerating cycle using an ejector in accordance with the 4th embodiment of the present invention. Features in which the 4th embodiment is different from the above-mentioned respective embodiments will be mainly described. In this embodiment, an internal heat exchanger 70 as heat recovery unit that exchanges heat between refrigerant flowing out of the radiator 20 and refrigerant flowing out of the ejector 30 and drawn by the compressor 10 is located between ejector 30 and the compressor 10. According to this, the latent heat of liquid refrigerant flowing out of the ejector 30 can be recovered by reducing the enthalpy at the inlet of the evaporator 50 by the use of the internal heat exchanger 70.

Moreover, the vapor/liquid separator 60 can be located between the ejector 30 and the compressor 10. The internal heat exchanger 70 that exchanges heat between refrigerant flowing out of the radiator 20 and refrigerant flowing out of the vapor/liquid separator 60 and drawn by the compressor 10 is located between the vapor/liquid separator 60 and the compressor 10. According to this, the internal heat exchanger 70 can perform heat exchange on the downstream side of the vapor/liquid separator 60. As a result, it is possible to prevent liquid-phase refrigerant from flowing into the compressor 10.

5th Embodiment

Figure 5:
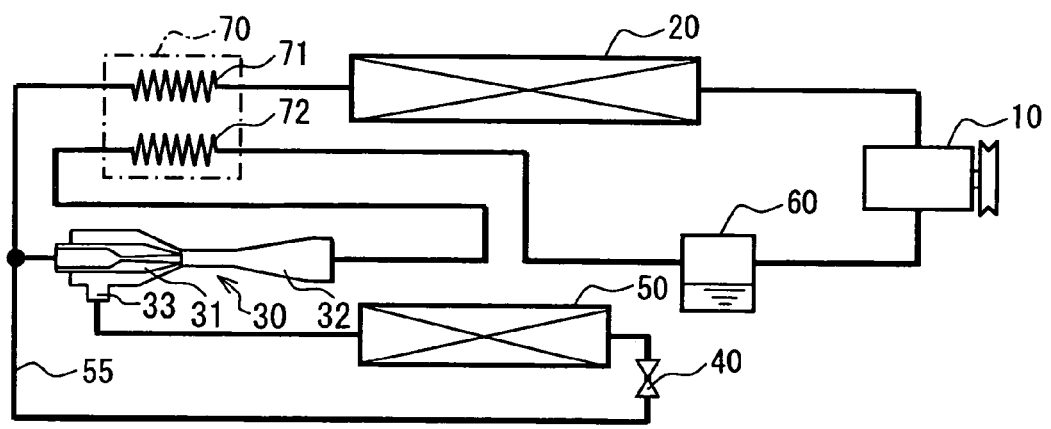
FIG. 5 is a schematic diagram of a vapor compression type refrigerating cycle using an ejector in a 5th embodiment of the present invention.

FIG. 5 is a schematic diagram of a vapor compression type refrigerating cycle (ejector cycle device) using an ejector in accordance with the 5th embodiment of the present invention. Features in which the 5th embodiment is different from the above-mentioned respective embodiments will be mainly described. In this embodiment, the vapor/liquid separator 60 is located between the ejector 30 and the compressor 10. The internal heat exchanger 70 that exchanges heat between refrigerant flowing out of the radiator 20 and refrigerant flowing out of the ejector 30 and flowing into the vapor/liquid separator 60 is located between ejector 30 and the compressor 10. According to this, the internal heat exchanger 70 performs heat exchange on the upstream side of the vapor/liquid separator 60. For this reason, it is possible to prevent liquid-phase refrigerant from flowing into the compressor 10. Further, it is possible to prevent an excessive increase in the discharge temperature of the compressor 10 and hence enhance the durability of high-pressure side pipe and the like.

6th Embodiment

Figure 6:
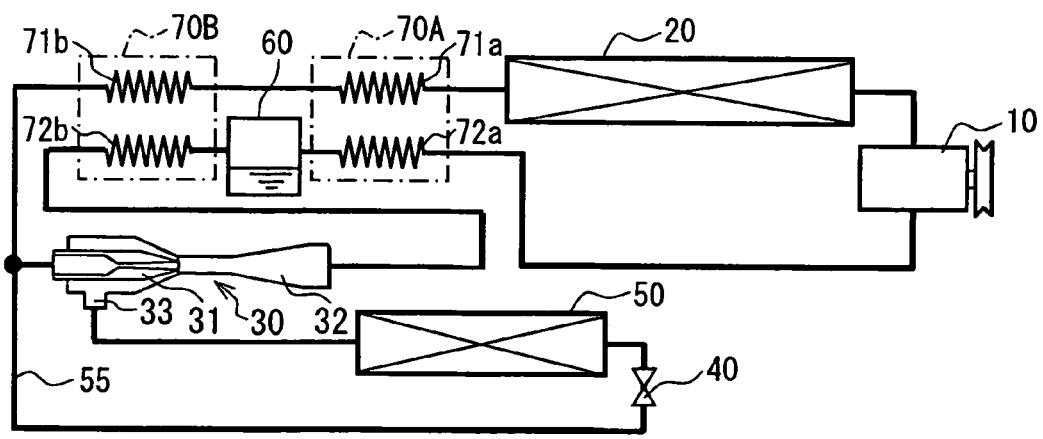
FIG. 6 is a schematic diagram of a vapor compression type refrigerating cycle using an ejector in a 6th embodiment of the present invention.

FIG. 6 is a schematic diagram of a vapor compression type refrigerating cycle (ejector cycle device) using an ejector in accordance with the 6th embodiment of the present invention. Features in which the 6th embodiment is different from the above-mentioned respective embodiments will be mainly described. In this embodiment, a plurality of internal heat exchangers 70A, 70B as heat recovery unit that exchanges heat between refrigerant flowing out of the radiator 20 and refrigerant flowing out of the ejector 30 and drawn by the compressor 10 are located between the ejector 30 and the compressor 10. The vapor/liquid separator 60 is located between a plurality of low-pressure refrigerant passages 72a, 72b of the plurality of internal heat exchangers 70A and 70B. In this regard, reference symbols 71a, 71b denote high-pressure refrigerant passages of the internal heat exchangers 70A and 70B, through which refrigerant flows out of the radiator 20.

According to this, the plurality of internal heat exchangers 70A, 70B are arranged and the vapor/liquid separator 60 is located between the plurality of low-pressure refrigerant passages 72a, 72b of the internal heat exchanges 70A and 70B. Hence, heat is exchanged between the outlet of the ejector 30 and the outlet of the vapor/liquid separator 60. Hence, high-pressure refrigerant can be cooled by cold refrigerant at the outlet of the vapor/liquid separator 60 and a refrigerant temperature at the outlet of the internal heat exchanger 70 can be decreased by refrigerant (in particular, liquid refrigerant) at the outlet of the ejector 30. Therefore, it is possible to further enhance a refrigerating capacity and a cycle efficiency.

In this embodiment, the flow order of refrigerant at the outlet of the ejector 30 and refrigerant at the outlet of the vapor/liquid separator 60 is shown in FIG. 6 but the flow order may be reversed. Moreover, the internal heat exchangers 70A, 70B and the vapor/liquid separator 60 may be constructed as an integrated module.

7th Embodiment

Figure 7:
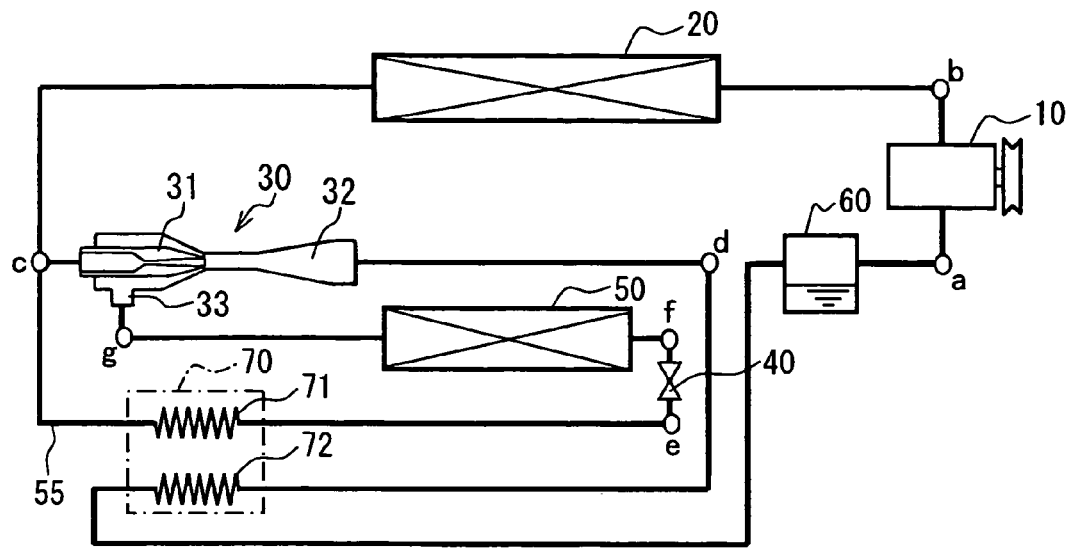
FIG. 7 is a schematic diagram of a vapor compression type refrigerating cycle using an ejector in a 7th embodiment of the present invention.
Figure 8:
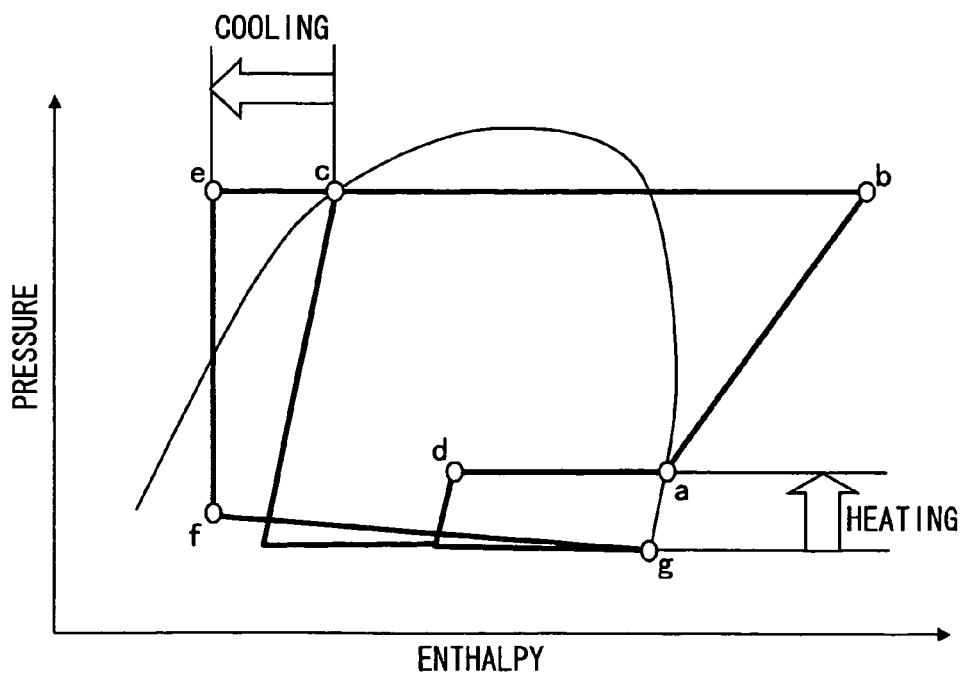
FIG. 8 is a p-h diagram in the vapor compression type refrigerating cycle using the ejector in FIG. 7.

FIG. 7 is a schematic diagram of a vapor compression type refrigerating cycle using an ejector in accordance with the 7th embodiment of the present invention. FIG. 8 is a p-h diagram in the vapor compression type refrigerating cycle using the ejector in FIG. 7. Features in which the 7th embodiment is different from the above-mentioned respective embodiments will be mainly described. In this embodiment, refrigerant flowing into the branch passage 55 from the radiator 20 is used as refrigerant flowing through the internal heat exchanger 70.

According to this embodiment, the internal heat exchanger 70 is arranged on the upstream side of the ejector 30 in the branch passage 55, and is provided on the suction flow side of the branch passage 55 to perform heat exchange with refrigerant flowing out from the ejector 30, as shown in FIG. 7. Hence, it is possible to prevent an increase in sub-cool at the inlet of the ejector 30 and to operate the refrigerating cycle without decreasing expansion loss energy in the ejector 30 and hence to increase the amount of pressure increase of the ejector 30. Moreover, it is possible to lower the evaporation temperature of the evaporator 50 and to enhance cooling performance. In FIG. 8, "a"-"g" indicate operation states corresponding to the positions "a"-"g" of the ejector cycle device in FIG. 7, respectively.

8th Embodiment

Figure 9:
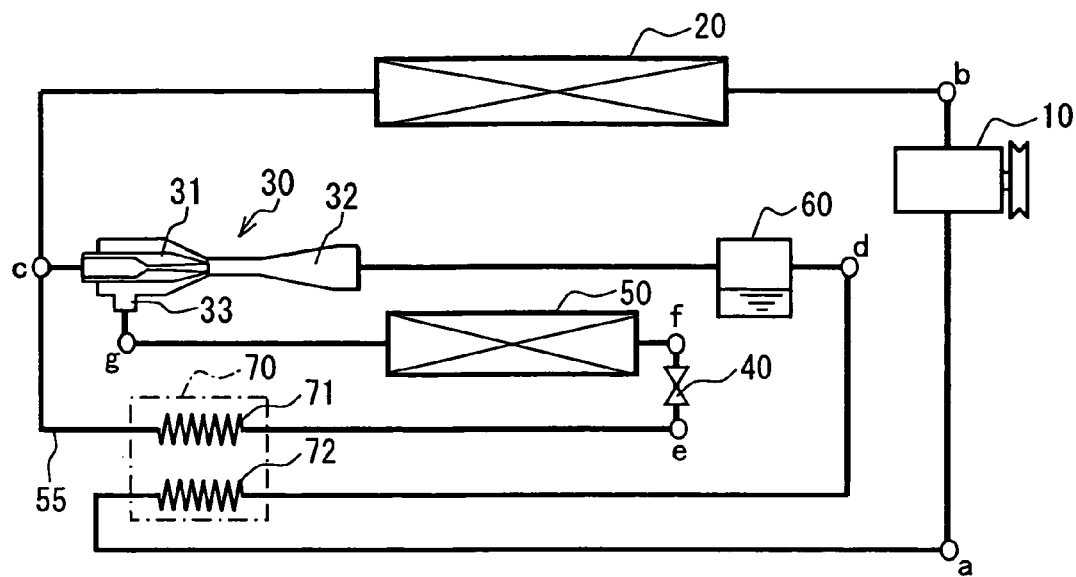
FIG. 9 is a schematic diagram of a vapor compression type refrigerating cycle (ejector cycle device) using an ejector in an 8th embodiment of the present invention.
Figure 10:
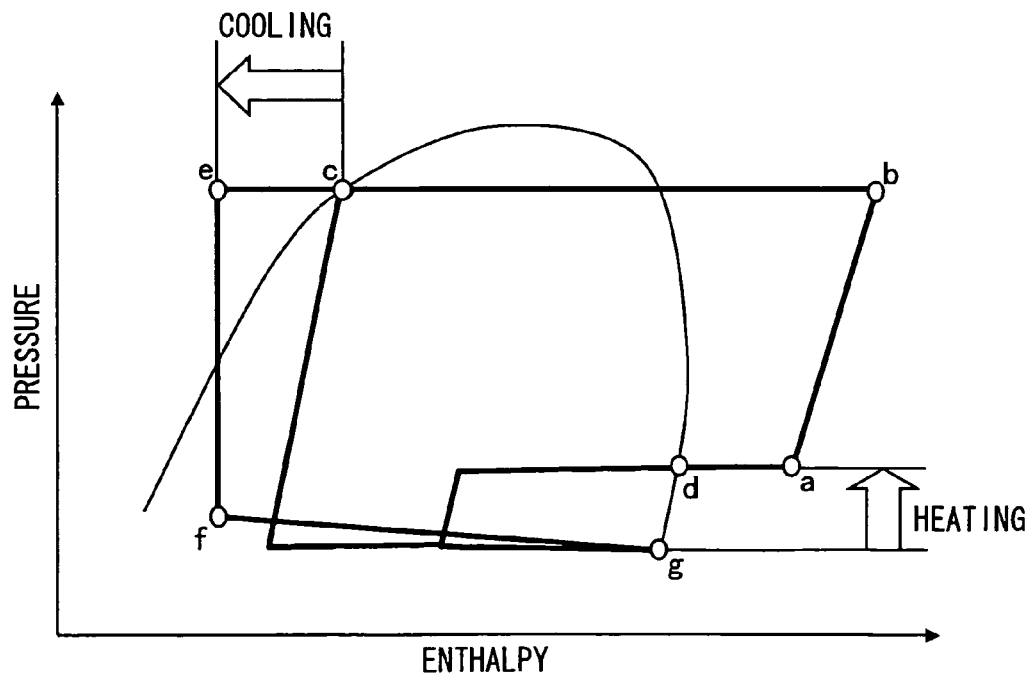
FIG. 10 is a p-h diagram in the vapor compression type refrigerating cycle using the ejector in FIG. 9.

FIG. 9 is a schematic diagram of a vapor compression type refrigerating cycle (ejector cycle device) using an ejector 30 in accordance with the 8th embodiment of the present invention. FIG. 10 is a p-h diagram in the vapor compression type refrigerating cycle using the ejector in FIG. 9. Features in which the 8th embodiment is different from the above-mentioned respective embodiments will be mainly described.

In this embodiment, the vapor/liquid separator 60 is located between the ejector 30 and the compressor 10, and the internal heat exchanger 70 that exchanges heat between refrigerant flowing into the branch passage 55 and refrigerant flowing out of the vapor/liquid separator 60 and drawn by the compressor 10 is located between the vapor/liquid separator 60 and the compressor 10.

According to this embodiment, in the vapor compression type refrigerating cycle using an ejector of the 7th embodiment, the low-pressure refrigerant passage 72 of the internal heat exchanger 70 is constructed between the vapor/liquid separator 60 and the compressor 10. Hence, the amount of suction superheat of the compressor 10 (from a point "d" to a point "a" in the p-h diagram in FIG. 10) is increased to reduce the suction density of the compressor 10 to thereby decrease the flow rate of refrigerant. Therefore, it is possible to further reduce the compression power of the compressor 10. In FIG. 10, "a"-"g" indicate operation states corresponding to the positions "a"-"g" of the ejector cycle device in FIG. 9, respectively.

9th Embodiment

Figure 11:
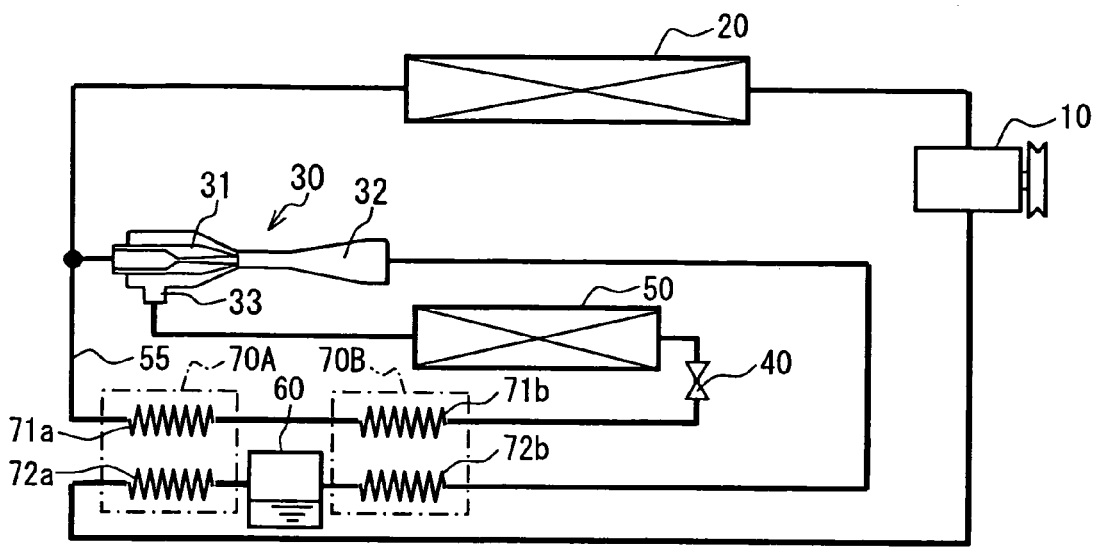
FIG. 11 is a schematic diagram of a vapor compression type refrigerating cycle (ejector cycle device) using an ejector in a 9th embodiment of the present invention.

FIG. 11 is a schematic diagram of a vapor compression type refrigerating cycle using an ejector in accordance with the 9th embodiment of the present invention. This embodiment is similar to the 6th embodiment in which: the plurality of internal heat exchangers 70A, 70B as heat recovery unit that exchanges heat between refrigerant flowing out of the radiator 20 and refrigerant flowing out of the ejector 30 and drawn by the compressor 10 are arranged; and the vapor/liquid separator 60 is located between the plurality of low-pressure refrigerant passages 72a, 72b of the plurality of internal heat exchangers 70A, 70B. In this embodiment, the plurality of internal heat exchangers 70A, 70B as heat recovery unit that exchanges heat between refrigerant flowing into the branch passage 55 and refrigerant flowing out of the ejector 30 and drawn by the compressor 10 are arranged, and the vapor/liquid separator 60 is located between the plurality of low-pressure refrigerant passages 72a, 72b of the plurality of internal heat exchangers 70A, 70B.

According to this embodiment, the plurality of internal heat exchangers 70A, 70B are arranged and the vapor/liquid separator 60 is located between the plurality of low-pressure refrigerant passages 72a, 72b. Hence, heat is exchanged between the outlet of the ejector 30 and the outlet of the vapor/liquid separator 60. Hence, high-pressure refrigerant can be cooled by cold refrigerant at the outlet of the vapor/liquid separator 60 and a refrigerant temperature at the outlet of the internal heat exchanger 70 can be decreased by refrigerant (in particular, liquid refrigerant) at the outlet of the ejector 30. Therefore, it is possible to further enhance a refrigerating capacity and a cycle efficiency.

In this embodiment, the flow order of refrigerant at the outlet of the ejector 30 and refrigerant at the outlet of the vapor/liquid separator 60 is shown in FIG. 11, but the flow order may be reversed. Moreover, the internal heat exchangers 70A, 70B and the vapor/liquid separator 60 may be constructed as an integrated module.

10th Embodiment

Figure 12:
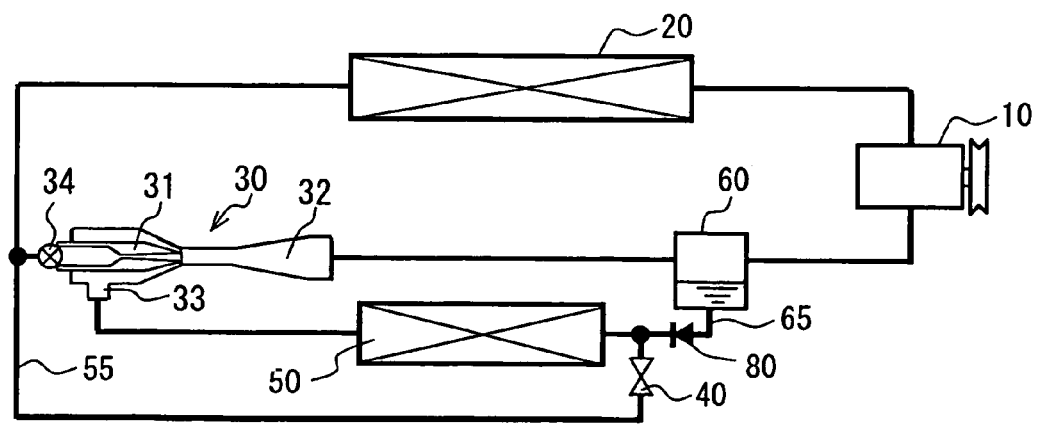
FIG. 12 is a schematic diagram of a vapor compression type refrigerating cycle (ejector cycle device) using an ejector in a 10th embodiment of the present invention.

FIG. 12 is a schematic diagram of a vapor compression type refrigerating cycle (ejector cycle device) using an ejector in accordance with the 10th embodiment of the present invention. Features in which the 6th embodiment is different from the above-mentioned respective embodiments will be described. In this embodiment, a liquid refrigerant supply passage 65 that discharges liquid-phase refrigerant from the vapor/liquid separator 60 and a check valve (check means, check unit) 80 that is arranged in the liquid refrigerant supply passage 65 and allows only a refrigerant flow in a direction flowing out of the vapor/liquid separator 60 are arranged, such that liquid-phase refrigerant supplied from the liquid refrigerant supply passage 65 is caused to flow into the upstream side of refrigerant flow of the evaporator 50.

The vapor/liquid separator 60 separates the refrigerant, which is discharged from the ejector 30, into gas-phase refrigerant and liquid-phase refrigerant, and returns the liquid-phase refrigerant from the liquid refrigerant supply passage 65 to the upstream of the evaporator 50 to thereby increase the amount of refrigerant flowing through the evaporator 50. According to this embodiment, it is possible to enhance a refrigerating capacity by an increase in enthalpy difference in the evaporator 50 and to decrease power by an increase in the suction pressure of the compressor 10 and hence to enhance COP by a large amount.

The liquid refrigerant supply passage 65 does not need to be provided with a differential pressure valve for controlling pressure but needs to be provided with only the check valve 80. In this embodiment, when there is little liquid refrigerant in the vapor/liquid separator 60, gas refrigerant flows into the evaporator 50 to increase pressure loss to thereby prevent refrigerant from flowing out of the vapor/liquid separator 60. Conversely, when there is much liquid refrigerant in the vapor/liquid separator 60, pressure loss decreases and hence much liquid refrigerant flows into the evaporator 50. In this manner, the flow rate of refrigerant from the vapor/liquid separator 60 can be automatically controlled.

In order to make this action appropriate, a level at which liquid refrigerant is taken out of the vapor/liquid separator 60 may be adjusted. Moreover, the check valve 80 may be provided with a fixed throttle for producing a pressure difference. Furthermore, the throttle unit 40 does not need to be a variable throttle but may be a variable throttle.

Moreover, the ejector 30 is a variable ejector 30 having a variable throttle mechanism 34 capable of controlling the flow rate of refrigerant. According to this, the flow rate of refrigerant can be controlled by the variable throttle mechanism 34 of the variable ejector 30 and hence the throttle unit 40 of the branch passage 55 can be a fixed throttle such as capillary tube.

11th Embodiment

Figure 13:
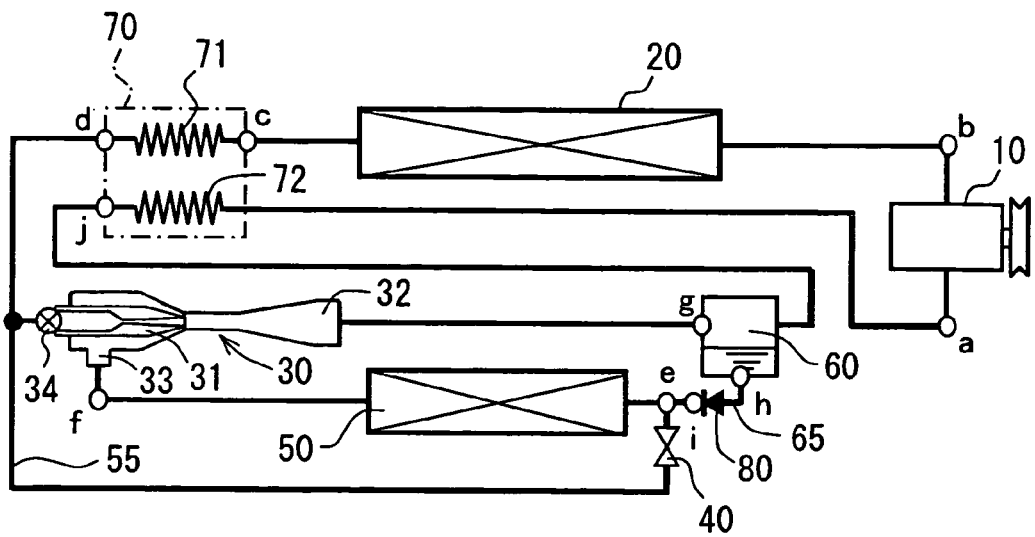
FIG. 13 is a schematic diagram of a vapor compression type refrigerating cycle (ejector cycle device) using an ejector in an 11th embodiment of the present invention.
Figure 14:
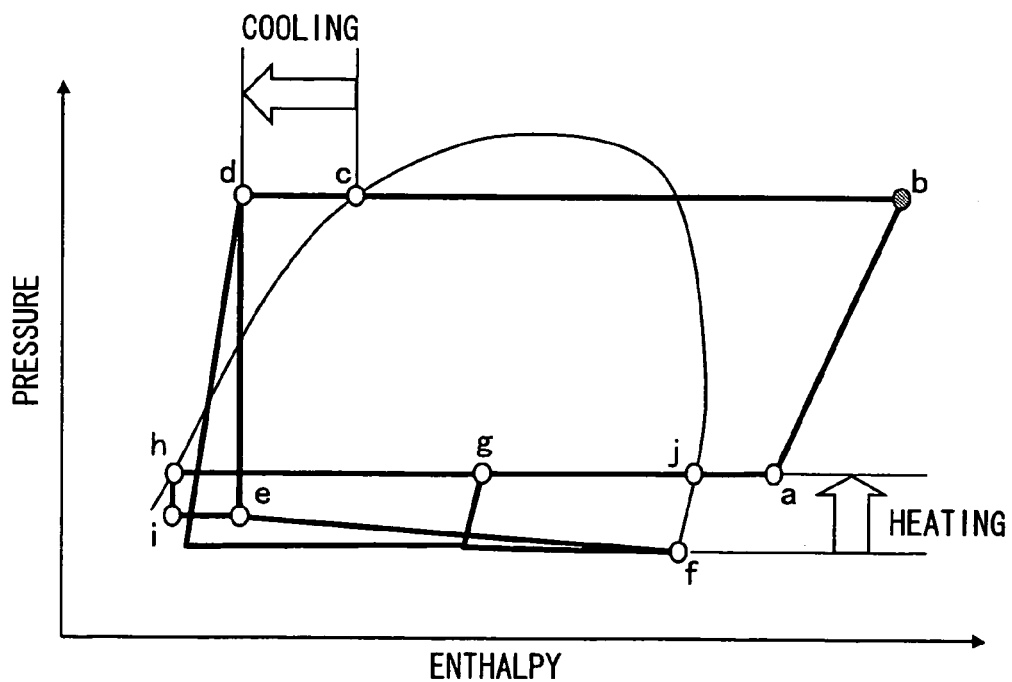
FIG. 14 is a p-h diagram in the vapor compression type refrigerating cycle using the ejector in FIG. 13.

FIG. 13 is a schematic diagram of a vapor compression type refrigerating cycle using an ejector in accordance with the 11th embodiment of the present invention. In this embodiment, the internal heat exchanger 70 is arranged in the vapor compression type refrigerating cycle using an ejector in FIG. 12. FIG. 14 is a p-h diagram in the vapor compression type refrigerating cycle using the ejector in FIG. 13. In FIG. 14, "a"-"g" indicate operation states corresponding to the positions "a"-"g" of the ejector cycle device in FIG. 13, respectively. According to this, just as with the 8th embodiment, in the vapor compression type refrigerating cycle using an ejector of the 10th embodiment, in particular, the low-pressure refrigerant passage 72 of the internal heat exchanger 70 is provided between the vapor/liquid separator 60 and the compressor 10. Hence, the amount of suction superheat of the compressor 10 (from a point g to a point a in the p-h diagram in FIG. 14) is increased to reduce the suction density of the compressor 10 to thereby decrease the flow rate of refrigerant. Therefore, it is possible to further reduce the compression power of the compressor 10.

This structure is effective also in a refrigerating cycle of supercritical pressure. The high-pressure refrigerant passage 71 of the internal heat exchanger 70 is on the outflow side of the radiator 20 in this embodiment, but may be on the inflow side of the branch passage 55 just as with the 7th to 9th embodiments. Moreover, in this embodiment, the low-pressure refrigerant passage 72 of the internal heat exchanger 70 is constructed between the vapor/liquid separator 60 and the compressor 10. However, just as with the 5th and 7th embodiments, the low-pressure refrigerant passage 72 of the internal heat exchanger 70 may be constructed between the ejector 30 and the vapor/liquid separator 60, or just as with the 6th and 9th embodiments, a plurality of internal heat exchangers 70A, 70B that are both of these may be arranged.

In the above-mentioned embodiments, the ejector cycle device is typically used for the air conditioner for the vehicle. However, the ejector cycle device can be used for a heating unit such as water heater and a cooling unit such as refrigerating and cooling unit including vehicle-mounted type and stationary type. Moreover, in the above-mentioned embodiments, the critical pressure cycle using carbon dioxide ($CO_2$) can be used as the refrigerant cycle in the ejector cycle device. However, an ejector cycle device using an ejector, in which the pressure of high-pressure refrigerant is lower than the critical pressure of the refrigerant may be used and refrigerant may be a hydrocarbon (HC)-based natural refrigerant or a Freon-based refrigerant.

Moreover, in the above-mentioned embodiments, the variable displacement compressor is used as the compressor 10. However, an electrically operated compressor, the number of revolutions of which can be easily controlled, may be used. Furthermore, the fixed ejector 30 is Used in the above-mentioned embodiments, but it is also recommended that throttle unit (not shown) may be arranged on the upstream side of refrigerant flow of the nozzle 31 of the ejector 30 and that the pressure of refrigerant is reduced by two steps of this throttle unit and the nozzle 31.

The fixed ejector 30 incapable of controlling flow rate is used in the above-mentioned 1st to 9th embodiments, but a mechanical or electrical variable ejector 30 capable of controlling the flow rate may be used. The flow rate of the ejector 30 may be performed by the control of the flow rate (including on-off control) of the compressor 10. Alternatively, the flow rate of the ejector 30 may be controlled by a variable throttle mechanism arranged in the ejector 30 according to the state of refrigerant (pressure or temperature) at the outlet of the radiator 20 or the state of refrigerant (pressure pr temperature) at the outlet of the evaporator 50.

12th Embodiment

Figure 15:
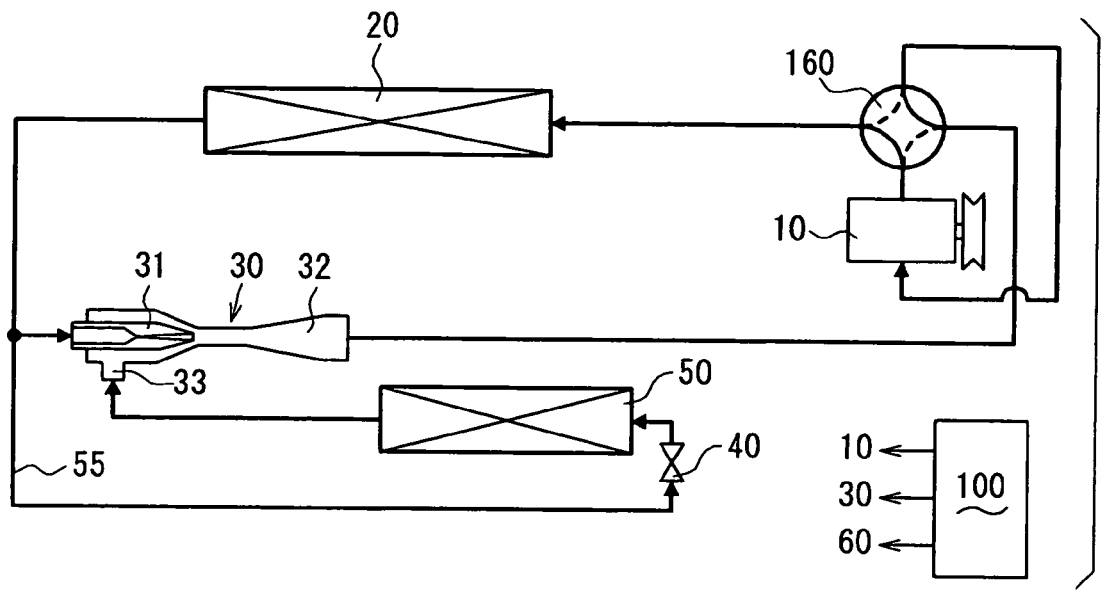
FIG. 15 is a schematic diagram of an ejector cycle device in a 12th embodiment of the present invention and shows an air cooling operation mode.
Figure 16:
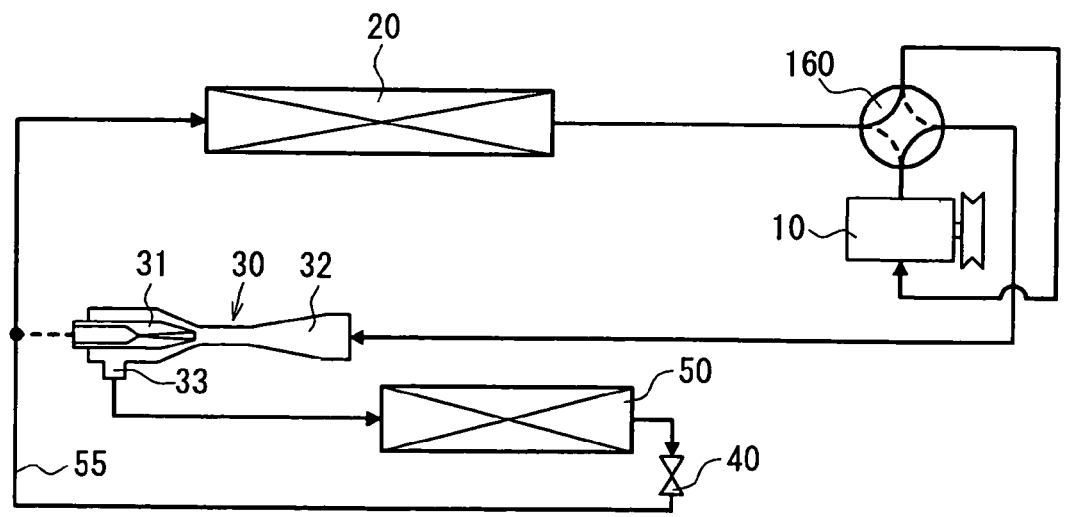
FIG. 16 is a schematic diagram of an air heating operation mode in the ejector cycle device in FIG. 15.

Hereinafter, the 12th embodiment of the present invention will be described in detail by the use of FIGS. 15 and 16. FIG. 15 is a schematic diagram of an ejector cycle device in accordance with the 12th embodiment of the present invention and shows a cooling operation mode, for example, an air cooling operation mode. Moreover, FIG. 16 is a schematic diagram of a heating operation mode, for example, an air heating operation mode in the ejector cycle device in FIG. 15.

The cooling operation mode is an operation mode that cools air for air conditioning or water as a medium to be cooled by bringing an indoor heat exchanger or a vehicle-mounted heat exchanger as a use-side heat exchanger into low temperature. The cooling operation mode may be an air cooling operation when being used for an air conditioner, or may be a refrigerating and freezing operation when being used for a refrigerator or a freezer.

The heating operation mode is an operation mode that heats air for air conditioning or water as a medium to be heated by bringing an indoor heat exchanger or a vehicle-mounted heat exchanger as a use-side heat exchanger into high temperature. The heating operation mode may be an air heating operation when being used for an air conditioner, may be a heating operation when being used for a high-temperature storage unit or may be a water heating operation when being used for a water heater. In this embodiment, an ejector cycle device in accordance with the present invention is applied to such an air conditioner for a vehicle, that uses carbon dioxide ($CO_2$) as refrigerant.

The compressor 10 is supplied with a driving force from a driving source such as a driving engine (not shown) and draws and compresses refrigerant. The compressor 10 in this embodiment employs a variable displacement compressor that variably controls its discharge flow rate (discharge capacity) in such a way as to bring the temperature of refrigerant drawn by the compressor 10 to a predetermined temperature. The discharge flow rate (discharge capacity) of the compressor 10 is controlled by an electronic control unit 100 as control means.

A four-way valve 160 as passage switching unit is connected to the discharge side of the compressor 10 and high-pressure refrigerant discharged from the compressor 10 is switched and supplied to an outdoor heat exchanger 20 (e.g., radiator in the cooling operation mode) or the outlet of the ejector 30, both of which will be described later. The four-way valve 160 is controlled by the electronic control unit 100.

The outdoor heat exchanger 20 is a heat exchanger that exchanges heat between refrigerant flowing inside and air outside the vehicle compartment as outside fluid blown from a blower (not shown). Moreover, an indoor heat exchanger 50 (e.g., evaporator in the cooling operation mode) as a first heat exchanger is a heat exchanger that exchanges heat between refrigerant flowing inside and air for air conditioning as outside fluid blown from a blower (not shown) into the vehicle compartment.

A reference numeral 40 is throttle unit such as a capillary tube (fixed throttle) for reducing the pressure of flowing refrigerant. The ejector 30 reduces the pressure of refrigerant flowing out of the outdoor heat exchanger 20 by the nozzle portion 31 to thereby expand the refrigerant and draws vapor-phase refrigerant evaporated in the indoor heat exchanger 50 from the suction portion 33 and converts expansion energy to pressure energy to thereby increase the suction pressure of the compressor 10. The refrigerant flowing out of this ejector 30 is drawn by the compressor 10. In this manner, a refrigerant circulating passage is formed in the ejector cycle device.

The ejector 30 has: a first connection portion communicating with the large-diameter side of the nozzle portion 31; a second connection portion located on the downstream side of a jet flow from the nozzle portion 31 and communicating with the diffuser portion of the ejector 30; and a third connection portion communicating with a suction space formed around the small-diameter side of the nozzle portion 31. In this embodiment, the direction of refrigerant flow in the second connection portion and the third connection portion during the cooling operation is reversed from that during the heating operation. In the cooling operation, the second connection portion becomes an outlet of the ejector 30 and the third connection portion becomes a suction port of the ejector 30. In the heating operation, the second connection portion becomes an inlet of the ejector 30 and the third connection portion becomes an outlet of the ejector 30.

In this refrigerant circulating passage, a branch point is arranged between the outdoor heat exchanger 20 and the nozzle portion 31 of the ejector 30, and the branch passage 55 for connecting this branch point to the suction portion 33 is provided. Moreover, the throttle unit 40 is arranged on the branch point side of the branch passage 55, and the indoor heat exchanger 50 is arranged on the suction portion 33 side of the branch passage 55.

Next, the operation of the ejector cycle device of the above-mentioned construction will be described. First, the air cooling operation mode (a first mode in the present invention), shown in FIG. 15, in which the indoor heat exchanger 50 is used as an evaporator on a low-temperature side will be described. When the compressor 10 is started, vapor-phase refrigerant is drawn from the suction side by the compressor 10 and the compressed refrigerant is discharged to the outdoor heat exchanger 20 by the four-way valve 160. Refrigerant cooled by outside air in the outdoor heat exchanger 20 is branched into a driving flow flowing into the nozzle 31 of the ejector 30 and a suction flow passing through the throttle unit 40 and the indoor heat exchanger 50.

Refrigerant flowing into the nozzle 31 is decompressed and expanded, and draws refrigerant in the evaporator 50. The refrigerant of the suction flow drawn from the evaporator 50 into the suction port 33 of the ejector 30 is mixed with the refrigerant of the driving flow jetted from the nozzle 31 in the mixing portion. The mixed refrigerant has its dynamic pressure converted to static pressure by the diffuser portion and the refrigerant flowing out of the ejector 30 returns to the compressor 10 via the four-way valve 160. In contrast, the refrigerant of the suction flow has its pressure reduced by the throttle unit 40 and then flows into the indoor heat exchanger 50. The refrigerant flowing into the indoor heat exchanger 50 is evaporated by absorbing heat from air for air conditioning blown off into the vehicle compartment so as to cool the air for air conditioning, and then is drawn into the suction port 33 of the ejector 30.

At this time, in the mixing portion of the ejector 30, the driving flow from the nozzle 31 is mixed with the suction flow from the indoor heat exchanger 50 in such a way that the sum of the momentum of the driving flow and the momentum of the suction flow is conserved. Hence, the pressure (static pressure) of refrigerant increases also in the mixing portion. In addition, in the diffuser portion of the ejector 30, as described above, the cross-sectional area of the passage gradually increases and hence the velocity energy (dynamic pressure) of refrigerant is converted to pressure energy (static pressure). Hence, in the ejector 30, the pressure of refrigerant is increased both in the mixing portion and in the diffuser portion.

Hence, the mixing portion and the diffuser portion are generically named a pressure increasing portion 32. In other words, in an ideal ejector 30, the pressure of refrigerant increases in the mixing portion in such a way that the sum of the momentum of the driving flow and the momentum of the suction flow is conserved and increases in the diffuser portion in such a way that energy is conserved.

Next, the heating operation mode (a second mode in the present invention), shown in FIG. 16, in which the indoor heat exchanger 50 becomes a high-temperature side will be described. When the compressor 10 is started, vapor-phase refrigerant is drawn from the suction side by the compressor 10 and the compressed refrigerant is supplied to the outlet side (diffuser side) of the ejector 30 by the four-way valve 160.

Refrigerant supplied from the second connection portion of the ejector 30 flows through the diffuser portion and the mixing portion and reaches the tip on the small-diameter side of the nozzle portion 31. At this time, because the tip of the nozzle portion 31 is a small-diameter opening, refrigerant hardly flows into the nozzle portion 31 and flows into a suction space surrounding the nozzle portion 31 and flows out to the third connection portion (suction portion 33).

As a result, refrigerant flows opposite to the direction of flow as a fluid pump of the ejector 30 and then flows into the heat exchanger 50. Hence, even when the nozzle portion 31 of the ejector 30 is always open or is not provided with a valve capable of closing its passage, the flow of a large amount of refrigerant into the nozzle portion 31 can be prevented.

When the nozzle portion 31 of the ejector 30 is provided with a needle valve as a valve capable of opening and closing the passage of the nozzle portion 31, it is also recommendable to provide a driving mechanism for closing the needle valve and to provide the control unit 100 with means for controlling the driving mechanism. Moreover, an opening/closing valve may be provided on the upstream side of the nozzle portion 31, that is, in the passage of the heat exchanger 20, and the opening/closing valve may be opened and closed by the control unit 100.

Refrigerant flowing through the ejector 30 and flowing out of the suction portion 33 flows through the indoor heat exchanger 50 and heats air for air conditioning, which flows into the vehicle compartment, thereby being cooled. Refrigerant flowing out of the indoor heat exchanger 50 has its pressure reduced by the throttle unit 40 and then flows into the outdoor heat exchanger 20 and absorbs heat from outside air and evaporates. Refrigerant flowing out of the outdoor heat exchanger 20 flows through the four-way valve 160 and returns to the compressor 10.

Next, the features and effects of this 12th embodiment will be described. First, the ejector cycle device of this embodiment includes: the compressor 10 that draws, compresses, and discharges refrigerant; the ejector 30 that is arranged in the refrigerant circulating passage having refrigerant caused to flow by the compressor 10 and has an inlet and a discharge port, which are connected in series with each other, and jets high-pressure refrigerant supplied from the inlet to the discharge port to thereby suck refrigerant from the suction port 33 and delivers the refrigerant to the discharge port; the branch passage 55 that connects the inlet to the suction port 33; the indoor heat exchanger 50 arranged in the branch passage 55; and the four-way valve 160. The four-way valve 160 switches between the first mode, in which high-pressure refrigerant is supplied to the inlet of the nozzle 31 of the ejector 30 and in which refrigerant flows from the indoor heat exchanger 50 to the suction port 33, and the second mode in which high-pressure refrigerant is supplied to the discharge port of the ejector 30 and in which refrigerant flows from the suction port 33 to the indoor heat exchanger 50.

In this embodiment, the flow of high-pressure refrigerant discharged from the compressor 10 is switched between the flow to the inlet of the ejector 30 and the flow to the discharge port by the four-way valve 160. When high-pressure refrigerant discharged from the compressor 10 is caused to flow to the discharge port, the ejector 30 is caused to function as a passage through which refrigerant flows like a simple pipe.

According to this, the high temperature side and the low temperature side in the ejector cycle device can be switched by a simple construction. Hence, it is possible to reduce cost and to enhance the ease with which this cycle is mounted. In this embodiment, a third heat exchanger may be located between the ejector 30 and the compressor 10 when the indoor heat exchanger 50 is used as the first heat exchanger and the outdoor heat exchanger 20 is used as the second heat exchanger. This third heat exchanger may be constructed as a unit separate from the indoor heat exchanger 50 and may be arranged in such a way as to flow air independently from the indoor heat exchanger 50. Moreover, the third heat exchanger may be constructed integrally with the indoor heat exchanger 50 and may be arranged in such a way as to flow air in series.

The throttle unit 40 that brings the indoor heat exchanger 50 to low temperature in the first mode and brings the indoor heat exchanger 50 to high temperature in the second mode is located between the inlet of the nozzle 31 of the ejector 30 and the indoor heat exchanger 50. The outdoor heat exchanger 20 that becomes high temperature in the first mode and becomes low temperature in the second mode is arranged in the refrigerant circulating passage. According to this, a vapor compression type heat pump cycle that transfers heat on the low temperature side to the high temperature side can be constructed between the indoor heat exchanger 50 and the outdoor heat exchanger 20.

In this embodiment, because $CO_2$ is used as the refrigerant, the pressure of refrigerant on the high pressure side is larger than a critical pressure. In the state of a two-phase flow in which gas having pressure lower than the critical pressure is mixed with liquid, the velocity of flow of refrigerant in the nozzle portion 31 is decreased by the slip of liquid and gas (non-equilibrium in velocity) and hence the amount of increase in the pressure, which is the efficiency of the ejector 30, is decreased. However, according to this embodiment, by operating high-pressure refrigerant at a supercritical pressure, refrigerant in the ejector 30 becomes a single phase flow.

Hence, this can increase the efficiency of the ejector 30 itself and increases the amount of increase in the pressure of the ejector 30 and hence can enhance cooling performance.

13th Embodiment

Figure 17:
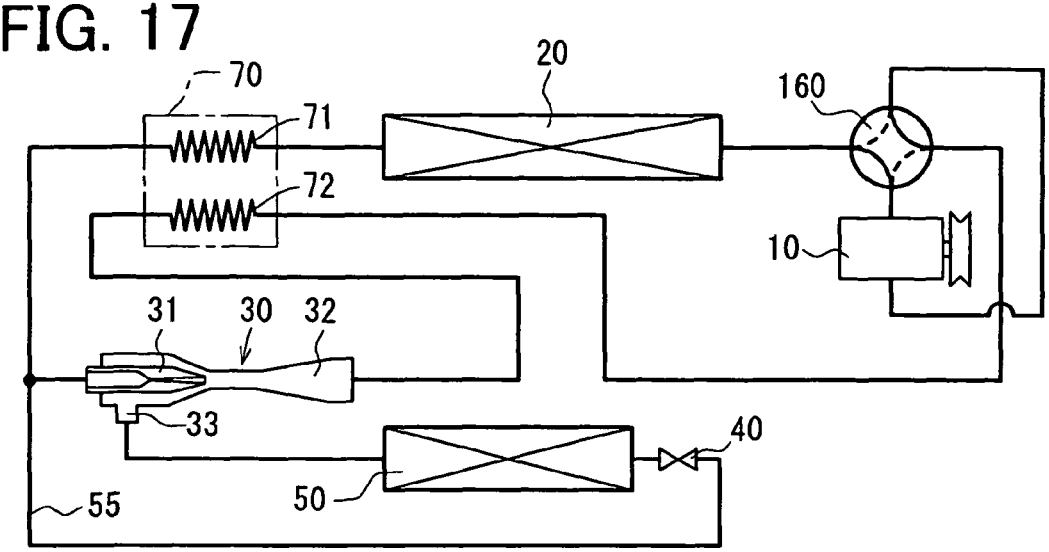
FIG. 17 is a schematic diagram of an ejector cycle device in a 13th embodiment of the present invention.

FIG. 17 is a schematic diagram of an ejector cycle device in accordance with a 13th embodiment of the present invention. Portions in which this embodiment is different from the 12th embodiment will be mainly described. In this embodiment, the internal heat exchanger 70 as heat recovery unit that exchanges heat between refrigerant flowing out of the outdoor heat exchanger 20 and refrigerant flowing out of the ejector 30 and drawn by the compressor 10 at the time of the first mode is located between the ejector 30 and the compressor 10.

According to this, the action of reducing enthalpy at the inlet of the indoor heat exchanger 50 is produced by increasing sub-cool by providing the internal heat exchanger 70 such as double pipe. Hence, it is possible to increase the enthalpy difference between the inlet and the outlet of the indoor heat exchanger 50 and hence to enhance the cooling performance of the indoor heat exchanger 50.

In the refrigerating cycle having the internal heat exchanger 70, the degree of superheat on the suction side of the compressor 10 is increased and the discharge temperature of the compressor 10 is increased as compared with a conventional refrigerating cycle having no internal heat exchanger 70. However, in the present invention, suction pressure can be increased by the pressure increasing effect of the ejector 30 and hence an increase in the discharge temperature can be prevented. In this embodiment, as shown in FIG. 17, the high-pressure refrigerant passage 71 of the internal heat exchanger 70 is provided between the outdoor heat exchanger 20 and the inlet of the nozzle 31, and the low-pressure refrigerant passage 72 of the internal heat exchanger 70 is provided between the outlet of the ejector 30 and the suction port of the compressor 10. The high-pressure refrigerant passage 71 of the internal heat exchanger 70 may be located between the branch point of the branch passage 55 and the nozzle portion 31.

14th Embodiment

Figure 18:
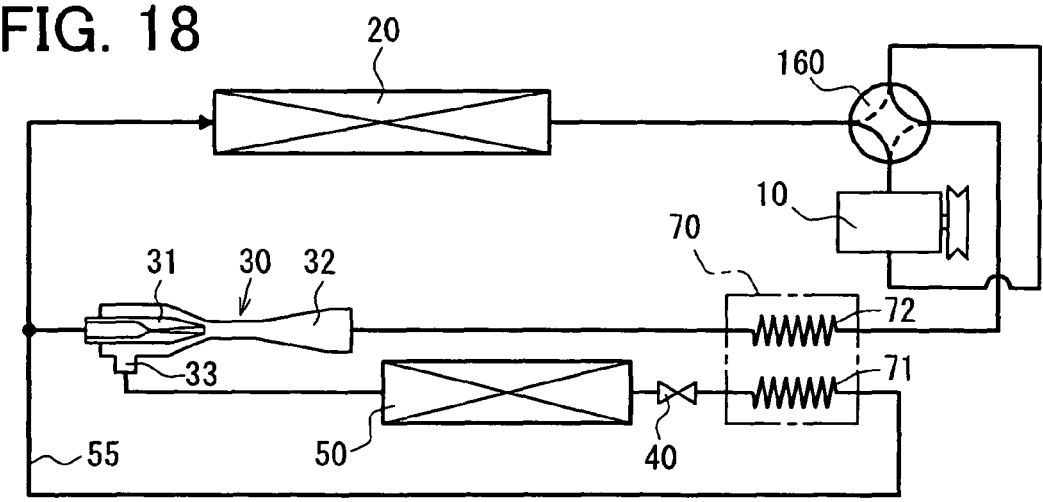
FIG. 18 is a schematic diagram of an ejector cycle device in a 14th embodiment of the present invention.

FIG. 18 is a schematic diagram of an ejector cycle device in accordance with the 14th embodiment of the present invention. Portions in which this embodiment is different from the above-mentioned 12-13th embodiments will be described. In this embodiment, refrigerant flowing into the branch passage 55 is used as refrigerant flowing through the internal heat exchanger 70. That is, as shown in FIG. 18, a first refrigerant passage 71 of the internal heat exchanger 70 is provided in the branch passage 55, and a second refrigerant passage 72 of the internal heat exchanger 70 is provided at the outlet side (diffuser side) of the ejector 30. According to this embodiment, the action of decreasing enthalpy at the inlet of the indoor heat exchanger 50 is produced by increasing sub-cool. Hence, it is possible to increase the enthalpy difference between the inlet and the outlet of the indoor heat exchanger 50 and hence to enhance the cooling performance of the indoor heat exchanger 50.

Moreover, as described above, when an additional heat exchanger (third heat exchanger) is located between the ejector 30 and the compressor 10, enthalpy at the outlet of the indoor heat exchanger 50 decreases and hence enthalpy at the inlet of the third heat exchanger where refrigerant from the indoor heat exchanger 50 decreases in the cooling operation mode. Hence, it is also possible to enhance the cooling performance of the third heat exchanger in the cooling operation mode.

15th Embodiment

Figure 19:
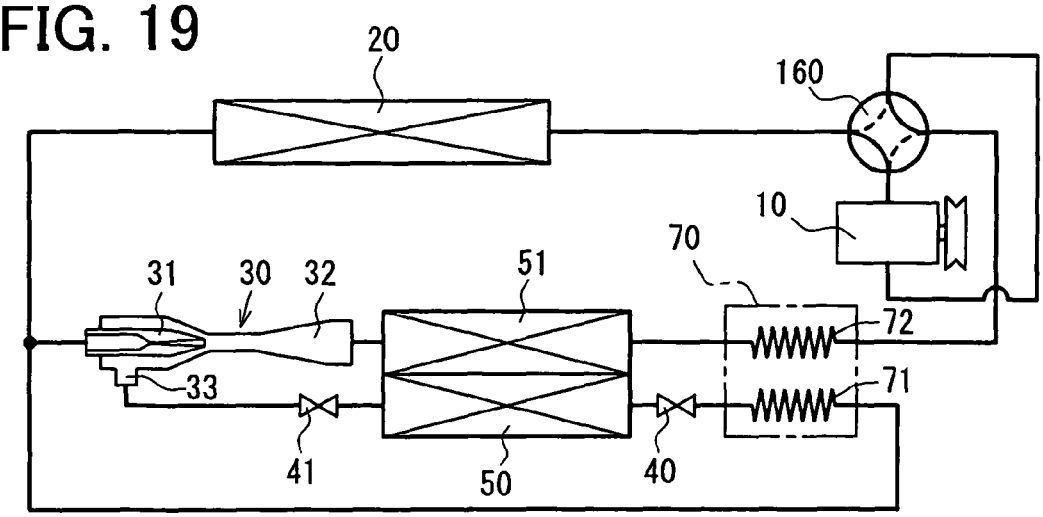
FIG. 19 is a schematic diagram of an ejector cycle device in a 15th embodiment of the present invention.

FIG. 19 is a schematic diagram of an ejector cycle device in accordance with the 15th embodiment of the present invention. Portions in which this embodiment is different from the above-mentioned 12th and 14th embodiments will be described. In this embodiment, first, a third heat exchanger 51 that exchanges heat between refrigerant and air for air conditioning blown into the vehicle compartment is located between the ejector 30 and the compressor 10, and a second throttle unit 41 (throttle means) is located between the suction portion 33 and the indoor heat exchanger 50.

According to this, in the case of the air heating operation mode (second mode), high-pressure refrigerant discharged from the compressor 10 flows through the heat exchanger 51, thereby being brought to a state where it can heat outside fluid (outside air). Then, the high-pressure refrigerant flows through the ejector 30, is pressure-reduced by the second throttle unit 41 and flows through the indoor heat exchanger 50, thereby being brought to a state where it can cool the outside fluid (outside air). Hence, when air for air conditioning flows through the indoor heat exchanger 50 and the third heat exchanger 51 in succession, the air for air conditioning can be dehumidified and can be heated at a suitable temperature.

In contrast, when the second throttle unit 41 is fully opened, both of the third heat exchanger 51 and the indoor heat exchanger 50 function as air heating heat exchangers. Furthermore, air can be dehumidified and heated by controlling the degree of throttle of the second throttle unit 41. Moreover, the indoor heat exchanger 50 and the third heat exchanger 51 can be formed as an integrated unit. In this case, it is possible to reduce cost by integrating them and to eliminate an extra space between the heat exchangers 50, 51 and hence to improve the ease with which the heat exchangers 50, 51 are mounted.

16th Embodiment

Figure 20:
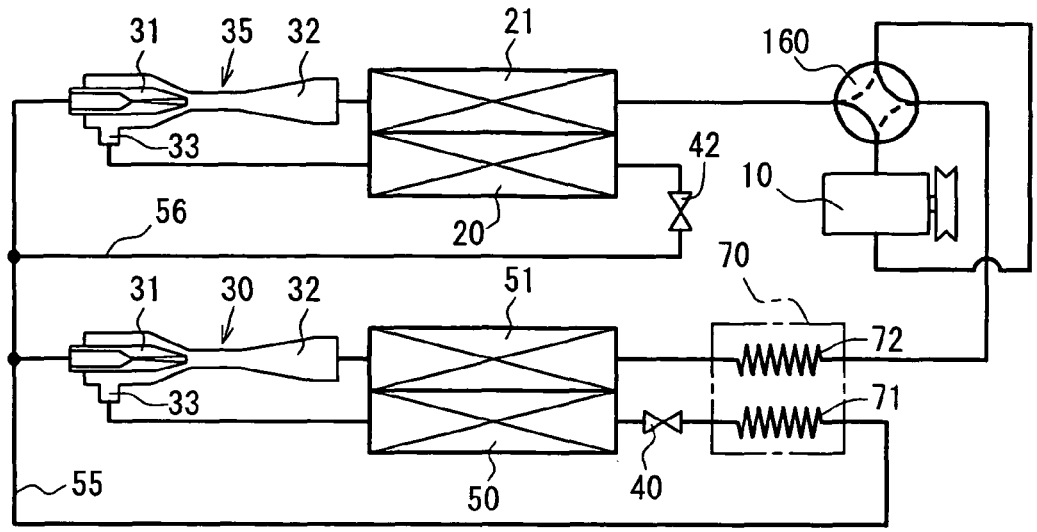
FIG. 20 is a schematic diagram of an ejector cycle device in a 16th embodiment of the present invention.

FIG. 20 is a schematic diagram of an ejector cycle device in accordance with the 16th embodiment of the present invention. Portions in which this embodiment is different from the above-mentioned 12th-15th embodiments will be described. In this embodiment, the ejector 30 is used as a first ejector, and a second ejector 35 and a second branch passage 56 are provided on the outdoor heat exchange 20 side. In the ejector cycle device, at the time of the air heating operation mode (second mode), the high-pressure refrigerant on the downstream side of the indoor heat exchanger 50 flows into the inlet of the nozzle portion 31 of the second ejector 35. Furthermore, the second branch passage 56 introduces a refrigerant flow branched from the refrigerant circulating passage, and the outdoor heat exchanger 20 is arranged in the second branch passage 56 and evaporates refrigerant.

In the air cooling operation mode (first mode), the second ejector 35 may be used as only a refrigerant passage.

A reduction in the power of the compressor 10 by the pressure increasing effect of the ejector 30 is desired in the air cooling operation mode and in the air heating operation mode. However, in the construction of the 12th embodiment, the effect of the ejector 30 can be produced in the air cooling operation mode but, in the air heating operation mode, the cycle is the same as a general expansion valve cycle. According to this 16$^{th}$ embodiment, the second ejector 35 is also arranged on the outdoor heat exchange 20 side. Therefore, also in the air heating operation mode, the effect of a reduction in the power of the compressor 10 can be produced by the pressure increasing effect of the ejector 35. In FIG. 20, a fourth heat exchanger 21 is located between the second ejector 35 and the compressor 10.

17th Embodiment

Figure 21:
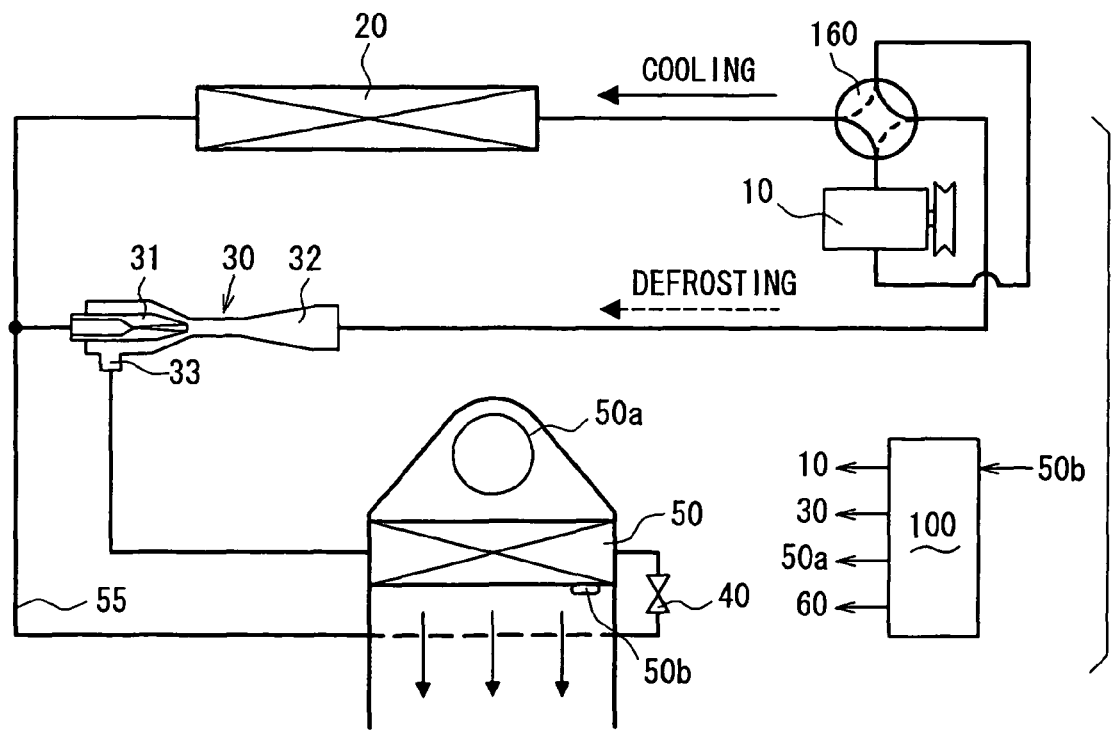
FIG. 21 is a schematic diagram of an ejector cycle device in a 17th embodiment of the present invention.

FIG. 21 is a schematic diagram of an ejector cycle device in accordance with the 17th embodiment of the present invention. In the above-mentioned 12-16th embodiments, the switching of the direction of refrigerant flow by the four-way valve 160 is performed for the purpose of switching between the air heating operation and the air cooling operation. However, in this embodiment, the four-way valve 160 is controlled for the purpose of removing the frost of the indoor heat exchanger 50 in the cooling operation of a heat pump cycle. When the heat pump cycle is continuously operated in the first mode (air cooling operation), the indoor heat exchanger 50 (evaporator) brought to a lower temperature is likely to have frost deposited thereon.

In particular, the indoor heat exchanger 50 used as the first heat exchanger is operated at lower temperature than the third heat exchanger 51 (see FIG. 19) and hence need to be provided with a frost removing means. Moreover, because a frost removing time has an effect on the total heat pump capacity, it is preferable that the frost removing means that has an immediate effect and can shorten the time required to remove frost. Hence, just as with the above-mentioned 12-16th embodiments, the four-way valve 160 is switched to reverse the direction of refrigerant flow to thereby remove frost. According to this, it is possible to remove frost within a short time with high efficiency by the simple operation of only switching the four-way valve 160.

Moreover, refrigerant flow flowing through the nozzle portion 31 of the ejector 30 can be made to be interrupted. In addition, when refrigerant is caused to flow out of the suction port 33, the refrigerant flow of the nozzle portion 31 is made to be interrupted. According to this, in the mode where refrigerant flows from the suction port 33 to the first heat exchanger 50, by interrupting refrigerant flow flowing through the nozzle portion 31, it is possible to flow high-temperature refrigerant through the first heat exchanger 50 without loss and hence to improve the defrosting performance of the first heat exchanger 50.

In short, according to the frost removing operation (defrosting operation) of this embodiment, frost can be removed within a shorter time with higher efficiency. The construction capable of interrupting refrigerant flowing through the nozzle portion 31 may be realized by totally closing a variable nozzle mechanism (not shown) or may be realized by arranging opening/closing means (not shown) on the upstream side of refrigerant flow of the nozzle portion 31. Moreover, this frost removing method is not limited to the ejector type heat pump cycle but may be also applied to a vapor compression type refrigerating cycle using a normal ejector.

When the deposition of frost is detected by a temperature sensor (not shown) arranged in the heat exchanger 50 at the time of removing frost and the operation is continuously performed under a predetermined temperature for a time longer than a specified time, refrigerant flow is reversed by the four-way valve 160 to start the frost removing operation. Alternatively, the integrated operation time of the compressor 10 can be determined in advance for each specified outside air temperature range. In this case, the frost removing operation is started every time the specified integrated operation time reaches. The frost removing operation is provided by bringing the four-way valve 160 in the state of cooling operation into the state of heating operation for a specified time or until the effect of removing frost is detected by a temperature sensor 50b.

Moreover, in order to prevent hot air from blowing into the space to be cooled, a blower 50a of the evaporator 50 may be stopped at the time of frost removing operation. Furthermore, the ejector 30 may be so constructed as to be totally closed during the frost removing operation in order to flow high-temperature refrigerant to the heat exchanger 50 with reliability. Still further, it is also recommended that the cycle in FIG. 21 be used as a cycle exclusive to the cooling operation.

In the case of the cycle exclusive to the cooling operation, when frost removing operation of the indoor heat exchanger 50 is required, the four-way valve 160 is reversed to the state of frost removing operation. Moreover, in FIG. 21, the cycle may be used as a cycle exclusive to the heating operation by using the heat exchanger 50 arranged in the branch passage as an outdoor heat exchanger and by using the heat exchanger 20 as an indoor heat exchanger as a use-side heat exchanger. In this case, when the frost removing operation of the outdoor heat exchanger 50 is required, the four-way valve 160 is reversed to the state of frost removing operation.

According to this embodiment, when the heat exchanger 50 connected between the upstream side of the ejector 30 and the suction port of the ejector 30 needs to have frost removed, high-pressure refrigerant is supplied from the outlet of the ejector 30 and is supplied to the heat exchanger 50 through the suction port 33 of the ejector 30, thereby the frost removing operation is performed. As a result, it is possible to remove the frost of the heat exchanger 50, which is normally used as an evaporator in the cooling operation by simple construction and control.

In the above-described embodiments except for FIGS. 19, 20, the refrigerant cycle has at least one ejector 30 and at least one heat exchanger 50. The heat exchanger 50 can be disposed on a secondary line between the suction port of the ejector 30 and the nozzle inlet port of the ejector 30. In this case, the external heat exchanger 50 performs heat exchange between refrigerant passing therethrough and an external medium that is to be cooled or heated. For example, in case of a cooling operation, the heat exchanger 50 is a heat exchanger located inside a room to be cooled. On the other hand, in case of a heating operation, the heat exchanger 50 is a heat exchanger located outside a room to be heated. The cycle has no external heat exchanger on a primary line between the outlet port of the ejector 30 and the compressor 10. The cycle may include at least one internal heat exchanger 70 on its primary line. The cycle may have the controller 100 as shown in FIG. 15 to achieve predetermined cooling or heating performance on the heat exchanger 50 by controlling at least one of operational factors such as an opening degree of the throttle components (40, 45, 34) and an operation of the compressor 10. The compressor 10 may be a fixed capacity type with on-off clutch, a variable capacity type or a motor driven type. The throttle components (40, 45 and 34) may be an electromagnetic valve that is capable of adjusting an opening degree of the throttling passage therein. In a preferred embodiment, the controller 100 controls the operational factors to keep an amount of liquid refrigerant flowing into the compressor 10 below a certain amount permitted in accordance with the compressor 10. For example, the controller controls the valve 40 and the compressor 10 in order to keep the refrigerant on the suction port of the compressor 10 in a dry condition or a super heated condition.

18th Embodiment

Figure 22:
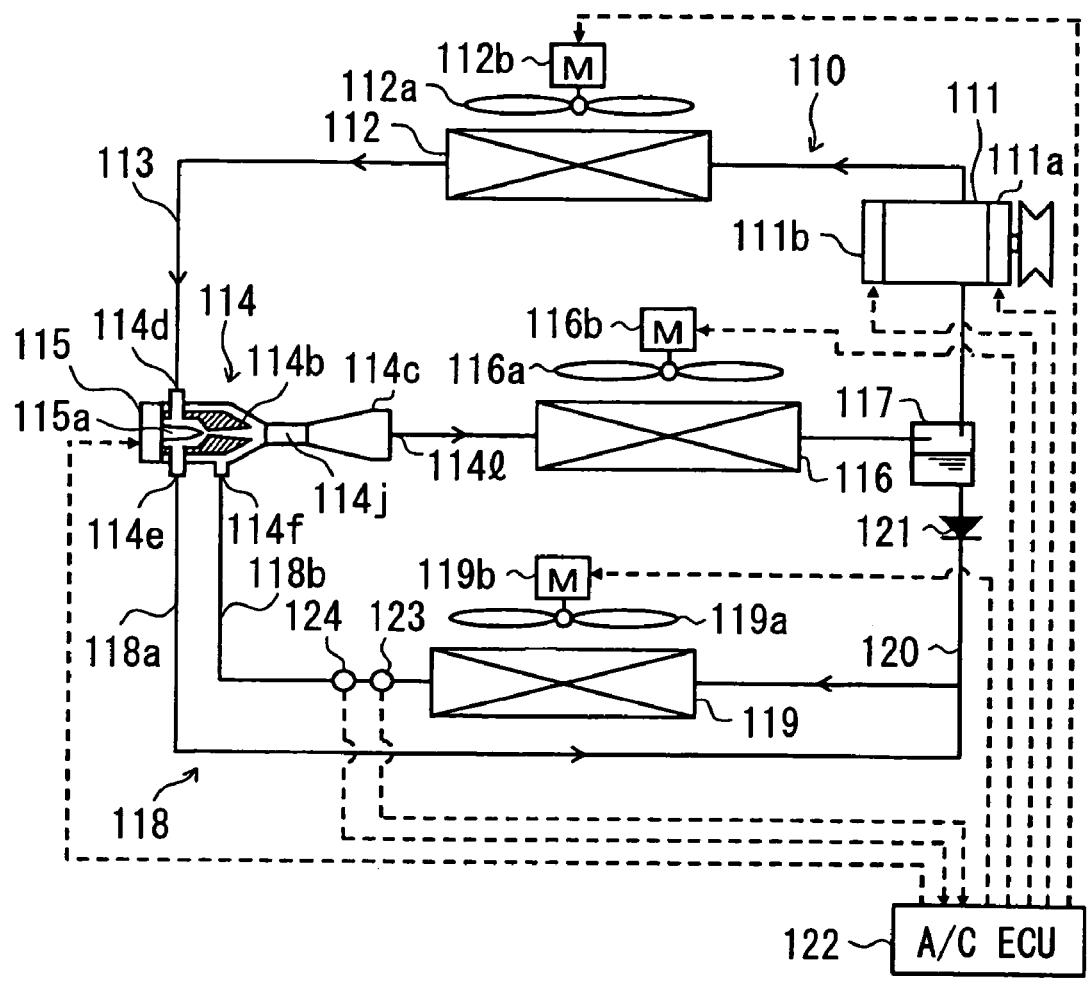
FIG. 22 is a schematic diagram of an ejector cycle device in an 18th embodiment of the present invention.

FIG. 22 shows an example in which an ejector and an ejector cycle device of the present invention are applied to an air-conditioning and refrigerating apparatus for a vehicle.

First, a refrigerant circulating passage 110 for circulating refrigerant is provided in the ejector cycle device. In the refrigerant circulating passage 110, a compressor 111 draws and compresses and discharges refrigerant and is rotated and driven by a vehicle driving engine (not shown) via an electromagnetic clutch 111a and a belt.

In this embodiment, a swash plate type variable displacement compressor capable of continuously controlling a discharge volume by a control signal from outside is used. Here, the discharge volume means the geometric volume of an operation space in which refrigerant is drawn and compressed, and means a cylinder volume between the top dead center and bottom dead center of a piston stroke.

In the swash plate type variable displacement compressor, the pressure of a swash chamber (not shown) is controlled by the use of a discharge pressure and a suction pressure to change the angle of inclination of a swash plate and to vary a piston stroke, thereby the discharge volume can be continuously varied within a range of nearly from 0% to 100%.

The compressor 111 has an electromagnetic displacement control valve 111b in order to control the pressure of the swash chamber. A pressure reactive mechanism (not shown) that produces a force F1 by the pressure of low-pressure refrigerant on the suction side of the compressor 111 and an electromagnetic mechanism (not shown) that produces an electromagnetic force F2 opposite to the force F1 by the pressure of low-pressure refrigerant Ps are provided in this electromagnetic displacement control valve 111b.

The electromagnetic force F2 of this electromagnetic mechanism is determined by a control current outputted from an air conditioning control unit 122 (A/C ECU) to be described later. The pressure of the swash chamber is changed by changing the rate of high-pressure refrigerant introduced into the swash chamber by a valve body (not shown) that is displaced according to the force F1 responsive to the pressure Ps of low-pressure refrigerant and the electromagnetic force F2.

Moreover, the discharge volume of the compressor 111 can be continuously changed nearly from 100% to 0% by controlling the pressure of the swash chamber. Hence, by decreasing the discharge volume to nearly 0%, the compressor 111 can be brought to the state where the operation is substantially stopped. Therefore, a clutch-less construction may be employed in which the rotary shaft of the compressor 111 is always coupled to a vehicle engine via a pulley and a belt V.

A refrigerant radiator 112 is arranged on the discharge side of refrigerant of the compressor 111. The radiator 112 is a heat exchanger that exchanges heat between high-pressure refrigerant discharged from the compressor 111 and outside air (air outside the vehicle compartment) blown by a blower 112a for the radiator 112 to thereby cool the high-pressure refrigerant.

The blower 112a for the radiator 112 is driven by a driving electric motor 112b, and the driving electric motor 112b is rotated and driven when an application voltage is outputted from the air conditioning control unit 122 to be described later. Moreover, in this embodiment, a usual Freon-based refrigerant is used as refrigerant circulating in the cycle and hence the ejector cycle device constructs a subcritical pressure cycle in which high pressure is not higher than the critical pressure of the refrigerant. Hence, the radiator 112 is used as a condenser for condensing refrigerant.

An ejector 114 is connected to the downstream side of the radiator 112 via a refrigerant pipe 113. The ejector 114 in this embodiment performs the function of pressure reducing means for reducing the pressure of refrigerant and also performs the function of refrigerant circulating means for circulating refrigerant by the suction action (entraining action) of refrigerant flow jetting out at high speeds. Further, the ejector 114 performs the function of pressure reducing means that reduces the pressure of refrigerant flowing into the branch point of a branch passage 118 to be described later, and the branch passage 118.

Figure 23:
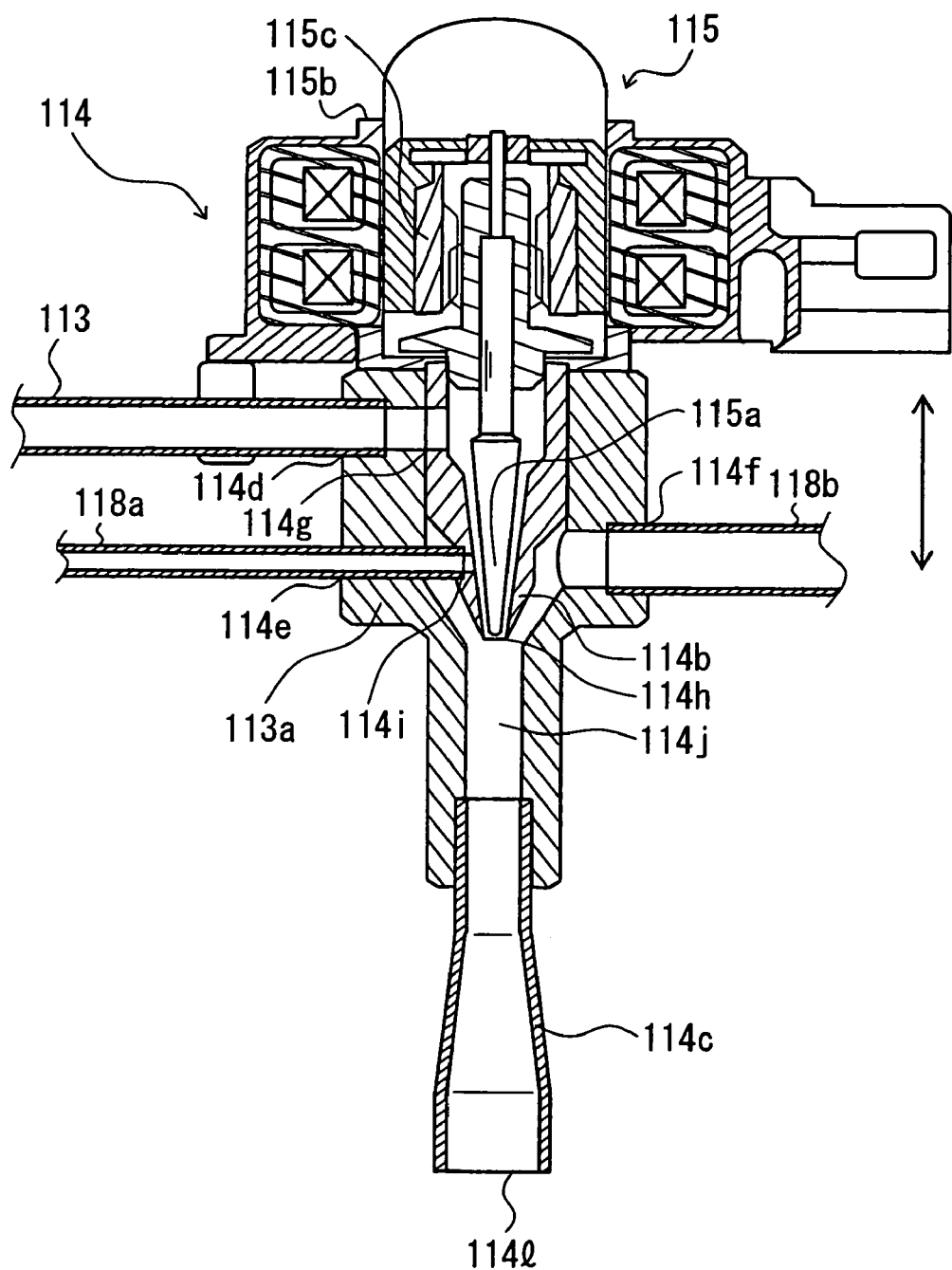
FIG. 23 is a cross-sectional view of an ejector of the 18th embodiment.

The structure of the ejector 114 in this embodiment is described by the use of FIG. 23. the ejector 114 is constructed of a housing 114a, a nozzle portion 114b, a diffuser portion 114c, and a passage area controlling mechanism 115.

The housing 114a plays the role of fixing and protecting the constituent parts of the ejector 114. The housing 114a has: a refrigerant inflow port 114d (a first connection portion) through which refrigerant flowing out of the refrigerant pipe 113 flows into the ejector 114; a branch refrigerant outflow port 114e (a fourth connection portion) through which refrigerant flowing-in from the refrigerant inflow port 114d flows to the branch passage 118a; and a refrigerant suction port 114f (a third connection portion) that is arranged in such a way as to communicate with the refrigerant jet port 114h of the nozzle portion 114b and draws refrigerant from the branch passage 118b.

The refrigerant pipe 113 is coupled to the refrigerant inflow port 114d, the branch passage 118b is coupled to the refrigerant suction port 114f, and the branch passage 118a is coupled to the branch refrigerant outflow port 114e in such a way as to pass through. These coupling portions are joined by brazing so as to prevent a leakage of refrigerant.

The nozzle portion 114b reduces the area of a refrigerant passage of refrigerant and reduces the pressure of refrigerant to expand the refrigerant in an isentropic manner and is fixed in the housing 114a.

The nozzle portion 114b has: a refrigerant inflow port 114g that causes the refrigerant inflow port 114d to communicate with the inside of the nozzle portion 114b so that refrigerant flows into the nozzle portion 114b; the refrigerant jet port 114h that jets out refrigerant flowing into the nozzle portion 114b from the refrigerant inflow port 114g into a mixing portion 114j to be described later; and a branch refrigerant outflow port 114i that is arranged on the upstream side of the refrigerant jet port 114h and causes the inside of the nozzle portion 114b to communicate with the branch refrigerant outflow port 114e.

Moreover, the branch passage 118a passing through the branch refrigerant outflow port 114e is coupled to the branch refrigerant outflow port 114i by brazing or the like so as to prevent the leakage of refrigerant.

Further, the mixing portion 114j is formed on the downstream side of refrigerant flow of the refrigerant jet port 114h in the housing 114a. The mixing portion 114j is provided to mix refrigerant jetted out of the refrigerant jet port 114h with refrigerant drawn from the refrigerant suction portion 114f.

The diffuser portion 114c forming a pressure increasing portion is arranged on the downstream side of refrigerant flow of the mixing portion 114j. This diffuser portion 114c is formed in a shape that gradually increases the area of passage of refrigerant and performs the action of decelerating refrigerant flow to increase the pressure of refrigerant. In other words, the diffuser portion 114c converts the velocity energy of refrigerant to pressure energy thereof.

Furthermore, the diffuser portion 114c has a diffuser outflow port 1141 (a second connection portion) from which refrigerant passing through the diffuser portion 114c flows out. The diffuser portion 114c is also joined by brazing or the like so as to prevent the leakage of refrigerant.

The passage area controlling mechanism 115 is fixed to the top (top side in FIG. 23) of the nozzle portion 114b of the housing 114a by using screws or the like via a sealing member or the like so as to prevent the leakage of refrigerant. The ejector 114 and the passage area controlling mechanism 115 are integrated into an integrated structure.

The passage area controlling mechanism 115 is constructed of a needle 115a and a driving part 115b. The needle 115a has a slender pointed tip portion nearly similar to the shape of the internal passage of the nozzle portion 114b and a shaft portion coupled to a rotor 115c. The shaft portion of the needle 115a is coupled to the rotor 115c by a screw-shaped coupling portion and hence can be moved in the direction of length (direction shown by arrow in FIG. 23) in the nozzle portion 115b when the screw-shaped coupling portion is turned.

The driving part 115b is constructed of a well-known stepping motor. When a control signal (pulse signal) is outputted from the air conditioning control unit 122 to be described later, the rotor 115c of the driving part 115b is rotated. When the rotor 115c is rotated, the screw-shaped coupling portion of the rotor 115c is rotated to move the needle 115a.

Figure 24A:
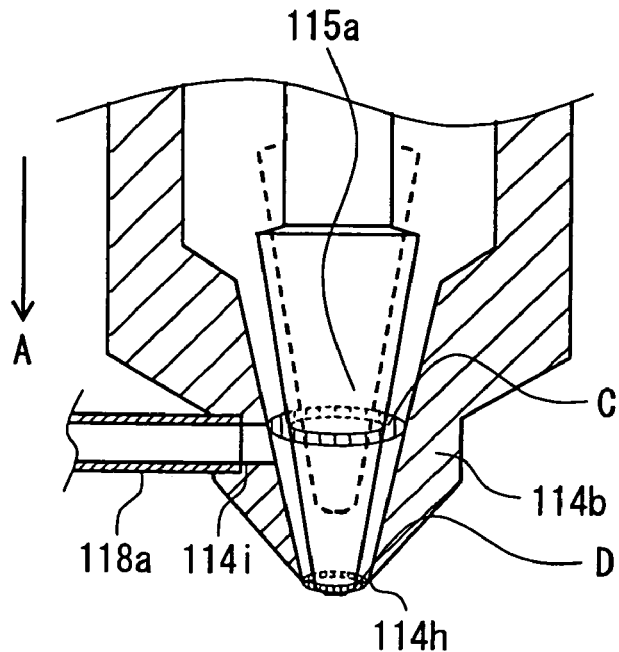
FIG. 24A is a schematic diagram showing a state where an area of a refrigerant passage of an ejector is contracted (throttled) and FIG. 24B is a schematic diagram showing a state where the area of refrigerant passage of the ejector is enlarged.

Here, the control of the amount of refrigerant flowing through the refrigerant jet port 114h and the branch refrigerant outflow port 114i will be described with reference to FIGS. 24A and 24B. FIG. 24A shows a state in which the needle 115a moves in the direction (direction shown by arrow A in FIG. 24A) that comes near to the refrigerant jet port 114h.

First, an annular clearance formed between the needle 115a and the upstream portion of the branch refrigerant outflow port 114i becomes a throttle passage C that passes the branch refrigerant outflow port 114i and the refrigerant jet port 114h. The area of this throttle passage C is decreased when the needle 115a moves in the direction that comes near to the refrigerant jet port 114h.

At the same time, an annular clearance formed between the refrigerant jet port 114h and the tip of the needle 115a becomes a throttle passage D that passes the branch refrigerant jet port 114h. The area of this throttle passage D is also decreased when the needle 115a moves in the direction that comes near to the refrigerant jet port 114h.

Refrigerant passing through the throttle passage C flows through the branch refrigerant outflow port 114i to the branch passage 118a. At the same time, refrigerant that does not flow out to the branch passage 118a passes through the throttle passage D and is discharged from the refrigerant jet port 114h. In other words, refrigerant is branched on the downstream side of the throttle passage C.

Figure 24B:
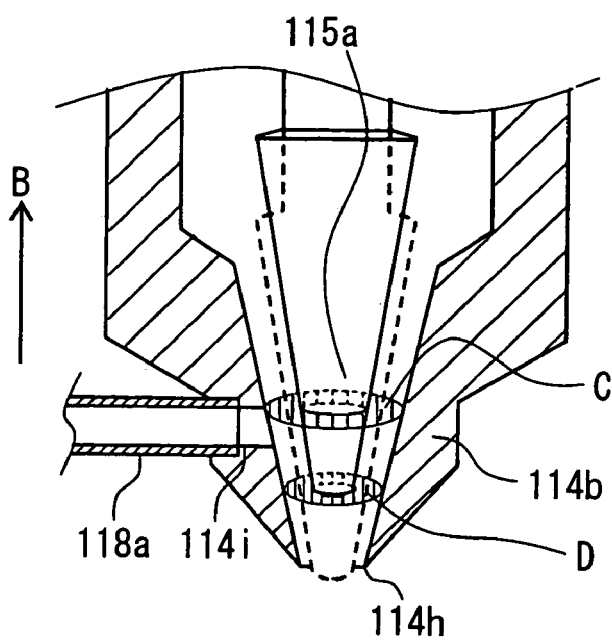

FIG. 24B shows a state in which the needle 115a moves in the direction (direction shown by arrow B in FIG. 24B) that comes away from the refrigerant jet port 114h. When the needle 115a moves in this direction B, the area of the throttle passage C is increased as compared with FIG. 24A and the area of the throttle passage D is also increased.

Hence, when the needle 115a is moved by the driving part 115b, the area of passage of refrigerant branched to the branch passage 118a and the area of passage of refrigerant jetted from the refrigerant jet port 114h of the nozzle portion 114b are changed.

To sum up, the needle 115a is passage area controlling means in this embodiment and the throttle passage C constructed of the nozzle portion 114a and the needle 115a becomes a variable throttle mechanism. Moreover, in this embodiment, construction in which refrigerant is branched on the upstream side of the refrigerant jet port 114h of the ejector 114 includes construction in which refrigerant is branched on the upstream side of the nozzle portion 114b.

Next, a first evaporator 116 is connected to the downstream side of refrigerant flow of the diffuser portion 114c of the ejector 114. The first evaporator 116 is arranged in a case member of a vehicle-mounted air-conditioning unit (not shown) and performs the operation of cooling air for air-conditioning a vehicle compartment.

Specifically, air for air-conditioning a vehicle compartment is blown into the first evaporator 116 by a first evaporator blower 116a of the vehicle compartment air-conditioning unit. Then, low-pressure refrigerant having pressure reduced by the ejector 114 absorbs heat from air for air-conditioning the vehicle compartment and evaporates, thereby the air for air-conditioning the vehicle compartment is cooled to thereby exert a cooling capacity.

The first evaporator blower 116a is driven by a driving electric motor 116b, and when the driving electric motor 116b has an application voltage outputted thereto from the air conditioning control unit 122 to be described later, the driving electric motor 116b is rotated and driven.

An accumulator 117 for separating vapor-phase refrigerant from liquid-phase refrigerant is connected to the downstream side of refrigerant flow of the first evaporator 116. Furthermore, the downstream side of vapor-phase refrigerant of the accumulator 117 is connected to the compressor 111, so that the vapor-phase refrigerant flowing out of the accumulator 117 is drawn by the compressor 111 and is again circulated in a refrigerant circulating passage 110.

The branch passage 118 is connected to the branch refrigerant outflow port 114e of the ejector 114. This branch passage 118 is constructed of a branch passage 118a that connects the branch refrigerant outflow port 114e of the ejector 114 to the inlet of a second evaporator 119 and a branch passage 118b that connects the outlet of the second evaporator 119 to the refrigerant suction port 114f of the ejector 114.

The second evaporator 119 is arranged in a refrigerator (not shown) mounted in the vehicle compartment and performs the cooling operation for cooling the inside of a refrigerator.

For example, air in the refrigerator is blown into the second evaporator 119 as air for cooling the inside of the refrigerator by a second evaporator blower 119a. Then, low-pressure refrigerant having pressure reduced by the ejector 114 absorbs heat from the air for cooling the inside of the refrigerator and evaporates in the second evaporator 119, thereby the air for cooling the inside of the refrigerator is cooled.

The second evaporator blower 119a is driven by a driving electric motor 119b, and when the driving electric motor 119b has an application voltage outputted thereto from the air conditioning control unit 122 to be described later, the driving electric motor 119b is rotated and driven.

Moreover, this embodiment is provided with a refrigerant introducing passage 120 for connecting the liquid-phase refrigerant side of the accumulator 117 to the inlet of the second evaporator 119. This refrigerant introducing passage 120 is a refrigerant passage for introducing liquid-phase refrigerant in the accumulator 117 into the second evaporator 119. A check valve 121 that allows refrigerant to flow only to the second evaporator 119 from the accumulator 117 is arranged in the refrigerant introducing passage 120.

The air conditioning control unit 122 is constructed of a well-known microcomputer including a CPU, a ROM, a RAM, and the like and its peripheral circuit. The air conditioning control unit 122 performs various kinds of computations and processing on the basis of control programs stored in the ROM to control the operation of the above-mentioned various kinds of parts (111a, 111b, 112b, 115b, 116b, 119b).

Moreover, detection signals from a group of various kinds of sensors and various kinds of operation signals from the operation panel (not shown) are inputted to the air conditioning control unit 122. Specifically, the group of sensors include a temperature sensor 123 for detecting the temperature Ts2 of refrigerant at the outlet of the second evaporator 119 and a pressure sensor 124 for detecting the pressure Ps2 of refrigerant at the outlet of the second evaporator 119. Moreover, the operation panel is provided with a temperature setting switch for setting the cooling temperature of a space to be cooled and the like.

Next, in the above-mentioned construction, the operation of this embodiment will be described. When the compressor 111 is driven by the vehicle engine, refrigerant is drawn and compressed by the compressor 111 and is brought into the state of high-temperature and high-pressure and then is discharged. Then, refrigerant discharged from the compressor 111 flows into the radiator 112. In the radiator 112, high-temperature refrigerant is cooled by outside air, thereby being condensed. Liquid-phase refrigerant flowing out of the radiator 112 flows through the refrigerant pipe 113, the refrigerant inflow port 114d of the ejector 114, and refrigerant inflow port 114g into the nozzle portion 114b.

The air conditioning control unit 122 computes the degree of superheat of refrigerant at the outlet of the second evaporator 119 on the basis of the detection value Ts2 of the temperature sensor 123 and the detection value Ps2 of the pressure sensor 124. The air conditioning control unit 122 changes the flow rate of refrigerant supplied to the second evaporator 119 from the branch refrigerant outflow port 114e of the ejector 114 in such a way that the degree of superheat becomes within a specified range.

Specifically, when the degree of superheat of refrigerant at the outlet of the second evaporator 119 becomes higher than a specified value, the air conditioning control unit 122 outputs a control signal (pulse signal) to the driving part 115b of the passage area controlling mechanism 115 in such a way that the flow rate of refrigerant at the branch refrigerant outflow port 114e becomes small to move the needle 115a in the direction of A in FIG. 24A to thereby reduce the throttle passage C. Conversely, when the degree of superheat of refrigerant becomes lower than a specified value, the air conditioning control unit 122 outputs a control signal to the driving part 115b in such a way that the flow rate of refrigerant at the branch refrigerant outflow port 114e becomes large to move the needle 115a in the direction of B in FIG. 24B to thereby enlarge the throttle passage C.

Furthermore, when the needle 115a is moved as described above, not only the flow rate of refrigerant supplied to the second evaporator 119 from the branch refrigerant outflow port 114e but also the flow rate of refrigerant jetted out of the refrigerant jet port 114h is changed.

Here, in the ejector cycle device in which refrigerant flowing out of the radiator 112 is branched on the upstream side of the nozzle portion 14b of the ejector 14, the flow rate of refrigerant flowing out of the radiator 112 is equal to the sum of the flow rate of refrigerant jetting out of the refrigerant jet port 114h and flowing into the first evaporator 116 and the flow rate of refrigerant flowing into the second evaporator 119 from the branch refrigerant outflow port 114e.

For this reason, in order to exert a high cooling capacity as the whole cycle, refrigerant flowing out of the evaporator 112 needs to be suitably distributed to the first evaporator 116 and the second evaporator 119.

Hence, the ejector cycle device of this embodiment is set in such a way that the flow rate of refrigerant at the refrigerant jet port 114$h$ and the flow rate of refrigerant at the branch refrigerant outflow port 114$e$ are changed in operatively connection with each other. Therefore, the ratio of the flow rate between the evaporators 116, 119 can be set so that a high cooling capacity can be obtained in the whole cycle when the degree of superheat of refrigerant at the outlet of the second evaporator 119 becomes a specified value. This ejector cycle device can be realized by appropriately designing the shapes of the branch refrigerant outflow port 114$e$ and the nozzle portion 114$b$ and the sizes of the needle 115$a$.

Refrigerant having flow rate determined in the above-mentioned manner and jetting out of the refrigerant jet port 114$h$ absorbs heat from air blown from the first evaporator blower 116$a$ of the first evaporator 116 to exert a cooling capacity. Refrigerant flowing out of the first evaporator 116 flows into the accumulator 117 and is separated into vapor-phase refrigerant and liquid-phase refrigerant. The separated vapor-phase refrigerant is again drawn by the compressor 111.

Refrigerant flowing into the branch passage 118$a$ from the branch refrigerant outflow port 114$e$ flows through the second evaporator 119. Further, liquid-phase refrigerant separated by the accumulator 117 is also drawn into the second evaporator 119 by the suction action of the ejector 114.

In this manner, the flow rate of refrigerant flowing through the second evaporator 119 can be controlled also by the liquid-phase refrigerant being drawn by the accumulator 117. Hence, the ratio of the flow rate between the evaporators 116, 119 can be brought further close to a value to increase the cooling capacity of the whole cycle.

Refrigerant flowing into the second evaporator 119 absorbs heat from air blown by the second evaporator blower 119$a$ to exert a cooling capacity. Vapor-phase refrigerant evaporated in the second evaporator 119 is drawn by the ejector 114 from the refrigerant suction port 113$d$ of the ejector 114 via the branch refrigerant passage 118$b$ and is mixed with liquid-phase refrigerant flowing through the nozzle portion 114$b$ in the mixing portion and then flows into the first evaporator 116.

As described above, in this embodiment, refrigerant on the downstream side of the diffuser portion 114$c$ of the ejector 114 is supplied to the first evaporator 116 and refrigerant having pressure reduced can be supplied also to the second evaporator 119 from the branch refrigerant outflow port 114$e$. Hence, the first evaporator 116 and the second evaporator 119 can exert a cooling operation at the same time.

In the cooling operation, the evaporation pressure of refrigerant of the first evaporator 116 is the pressure of refrigerant having pressure increased by the diffuser portion 114$c$. Because the outlet of the second evaporator 119 is connected to the refrigerant suction port 114$f$, the lowest pressure of refrigerant immediately after having pressure reduced by the nozzle portion 113$a$ can be applied to the second evaporator 119.

With this, the evaporator pressure (evaporator temperature) of refrigerant of the second evaporator 119 can be made lower than the evaporator pressure (evaporator temperature) of refrigerant of the first evaporator 116. Hence, the first evaporator 116 can be used for air-conditioning the vehicle compartment and the second evaporator 119 can be used for the refrigerator mounted in the vehicle compartment.

Because the suction pressure of the compressor 111 can be increased by the pressure increasing action of the diffuser portion 114$c$ of the ejector 114, the amount of compression work of the compressor 111 can be reduced by the increase in the suction pressure of the compressor 111, that is, the effect of saving the power of the compressor 111 can be produced.

Further, in this embodiment, the variable nozzle portion that reduces the pressure of refrigerant jetting out of the refrigerant jet port 114$h$ of the ejector 114 to control the flow rate, and the variable throttle mechanism that reduces the pressure of refrigerant flowing out of the branch refrigerant outflow port 114$e$ to control the flow rate are integrated into the ejector 114. Hence, this eliminates the need for arranging throttle unit that reduces the pressure of refrigerant to expand the refrigerant in the branch passage 118$a$, thereby reducing the size of the ejector cycle device.

Moreover, the throttle passages C, D can be controlled in operative connection with each other by moving the needle 115$a$ (passage area controlling means) by the driving part 115$b$. Hence, it is possible to reduce fluctuations in the ratio of flow rate between the flow rate of refrigerant flowing through the variable nozzle portion and the flow rate of refrigerant flowing through the variable throttle mechanism. As a result, it is easy to control this ratio of flow rate to a suitable ratio of flow rate between the evaporators 116, 119, and it is possible to prevent fluctuations in the ratio of flow rate between the evaporators 116, 119.

19th Embodiment

Figure 25:
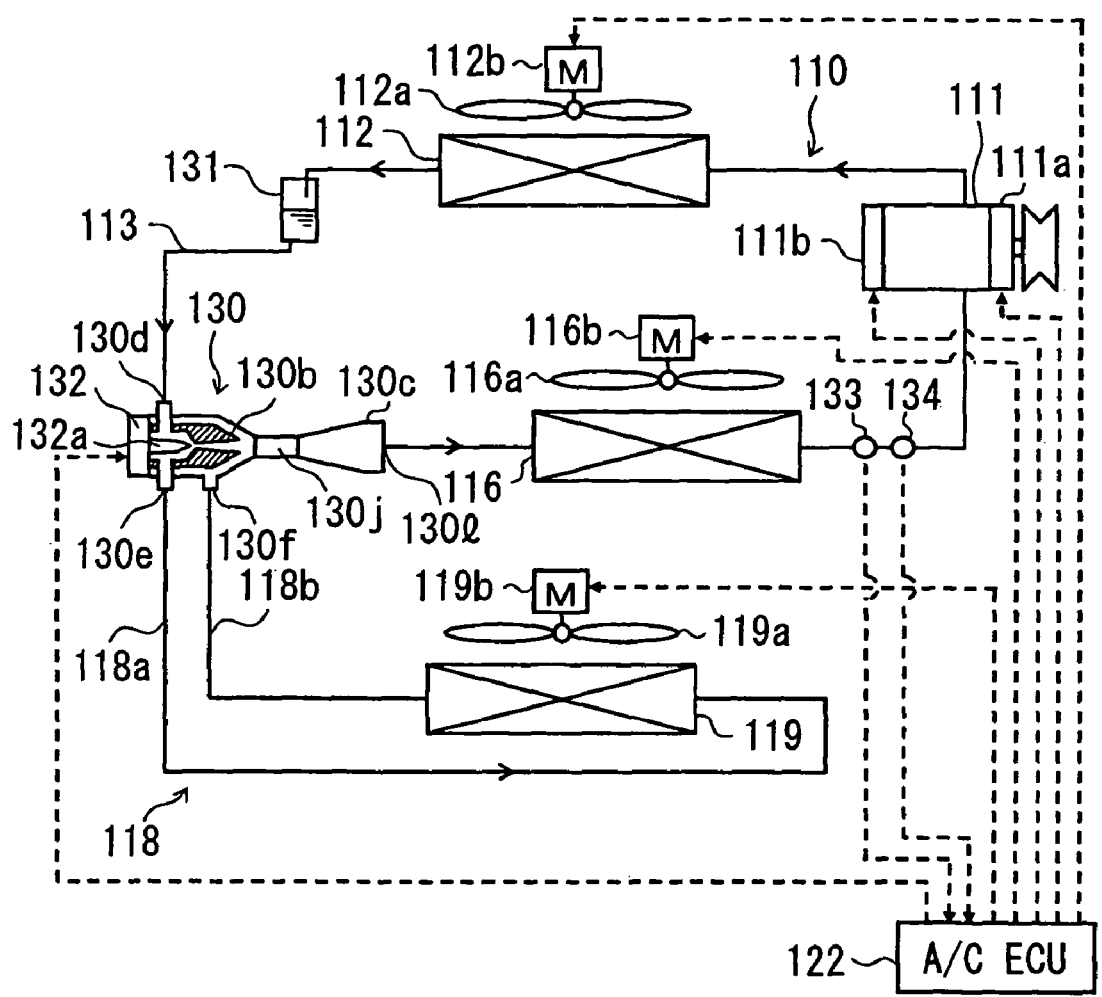
FIG. 25 is a schematic diagram of an ejector cycle device in a 19th embodiment of the present invention.

In the above-described 18th embodiment, the ejector cycle device is provided the accumulator 117, the refrigerant introducing passage 120, the check valve 121, the temperature sensor 123, and the pressure sensor 124. However, in this embodiment, as shown in FIG. 25, these parts are eliminated and a refrigerant pipe 113 on the downstream side of the radiator 112 is provided with a receiver 131 that separates vapor-phase refrigerant from liquid-phase refrigerant, a temperature sensor 133 that detects the temperature Ts1 of refrigerant at the outlet of the first evaporator 116, and a pressure sensor 134 that detects the pressure Ps1 of refrigerant at the outlet of the first evaporator 116.

Because the accumulator 117 is eliminated, the compressor 111 is connected to the downstream side of the first evaporator 116. The detection values of the temperature sensor 133 and the pressure sensor 134 are inputted to the air conditioning control unit 122.

Further, in the ejector 114 of the above-described 18th embodiment, the variable throttle mechanism that reduces the pressure of refrigerant, which flows out into the branch refrigerant outlet 114$e$ via the branch refrigerant outflow port 114$i$ constructed of the nozzle portion 114$b$, is constructed of the throttle passage C. However, in this embodiment, the ejector 114 is eliminated and there is provided with an ejector 130 not having the above-mentioned variable throttle mechanism.

Figure 26:
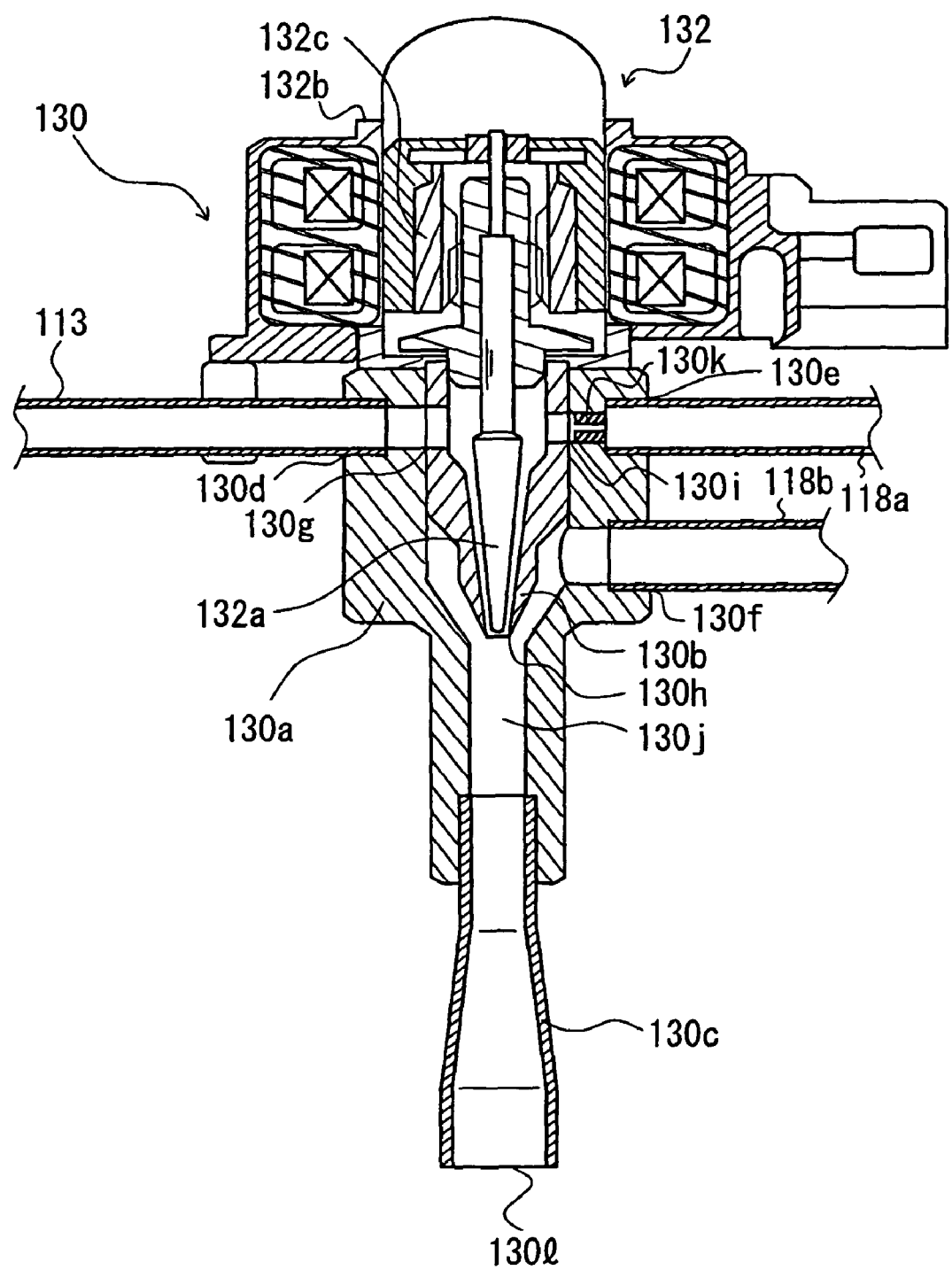
FIG. 26 is a schematic cross-sectional view of an ejector of the 19th embodiment.

Describing the construction of the ejector 130 of the 19th embodiment with reference to FIG. 26, just as with the 18th embodiment, the ejector 130 is constructed of a housing 130$a$, a nozzle portion 130$b$, a diffuser portion 130$c$, and a passage area controlling mechanism 132.

The housing 130$a$, just as with the 18th embodiment, has a refrigerant inflow port 130$d$ (a first connection portion) and a refrigerant suction port 130$f$ (a third connection portion). Further, the housing 130$a$ has a refrigerant outflow port 130$e$ (a fourth connection portion) that flows out refrigerant flowing in from the refrigerant inflow port 130$d$ to the branch passage 118$a$. Furthermore, the refrigerant pipe 113 is coupled to the refrigerant inflow port 130*d*, and a branch passage 118*b* is coupled to the refrigerant suction port 130*f*, and a branch passage 118*a* is coupled to the branch refrigerant outflow port 114*e*.

The nozzle portion 130*b* has a refrigerant inflow port 130*g* and a refrigerant jet port 130*h*. Further, the nozzle portion 130*b* has a branch refrigerant outflow port 130*i* that causes the inside of the nozzle portion 130*b* to communicate with the branch refrigerant outflow port 130*e*. This branch refrigerant outflow port 130*i* is arranged at a position where even when a needle 132*a* of a passage area controlling mechanism 132 to be described later moves, the flow rate of refrigerant of the branch refrigerant outflow port 130*e* does not change. Hence, the ejector 130 is not provided with a variable throttle mechanism.

Then, in order to reduce the pressure of refrigerant flowing out to the branch refrigerant outflow port 130*e* from inside of the nozzle portion 130*b* to thereby expand the refrigerant, the housing 130*a* has a fixed throttle 130*k* arranged therein. In this embodiment, the fixed throttle 130*k* is arranged in the housing 130*a* but, of course, may be arranged in the pipe of the branch passage 118*a*. Moreover, the fixed throttle 130*k* of this embodiment is specifically constructed of an orifice but may be constructed of a capillary tube.

Next, the passage area controlling mechanism 132 is set to control the flow rate of refrigerant jetting out of the refrigerant jet port 130*h* of the nozzle portion 130*b*. The passage area controlling mechanism 132 is constructed of a needle 132*a*, a driving part 132*b*, and a rotor 132*c*, just as with the 18th embodiment. The passage area controlling mechanism 132 changes the flow rate of refrigerant of the refrigerant jet port 130*h* of the nozzle portion 130*b* by moving the needle 132*a*.

A control signal is outputted to the driving part 132*b* from the air conditioning control unit 122. The 19th embodiment can be the same in the other points as the 18th embodiment.

Describing the operation of this embodiment having this construction, just as with the 18th embodiment, refrigerant discharged from the compressor 111 is cooled by the radiator 112 and is separated into vapor-phase refrigerant and liquid-phase refrigerant by the receiver 131. The liquid-phase refrigerant flowing out of the receiver 131 flows into the nozzle portion 130*b* via the refrigerant inflow port 130*d* and the refrigerant inflow port 130*g* of the ejector 114.

The air conditioning control unit 122 computes the degree of superheat of refrigerant at the outlet of the first evaporator 116 on the basis of the detection value Ts1 of the temperature sensor 133 and the detection value Ps1 of the pressure sensor 134. Then, the air conditioning control unit 122 moves the needle 132*a*, just as with the 18th embodiment, to change the area of the throttle passage D in such a way as to bring the degree of superheat within a predetermined range, thereby changing the flow rate of refrigerant jetting out of the refrigerant jet port 130*h* of the ejector 130.

Here, the area of passage of refrigerant of the fixed throttle 130*k* formed in the branch refrigerant outflow port 130*e* is designed in advance to be a specified size in such a way that when the degree of superheat of refrigerant at the outlet of the first evaporator 116 becomes a specified value, there is brought about such ratio of flow rate between evaporators 116, 119 that can exert a high cooling capacity as the whole cycle.

The flow rate of refrigerant of the refrigerant jet port 130*h* of the nozzle portion 130*b* and the flow rate of refrigerant of the fixed throttle 130*k* are determined and refrigerant flowing through the refrigerant jet port 130*h* exerts a cooling capacity in the first evaporator 116. Refrigerant flowing out of the first evaporator 116 is again drawn by the compressor 111. Refrigerant at the outlet of the first evaporator 116 becomes vapor-phase refrigerant having a specified degree of superheat and hence it does not happen that liquid-phase refrigerant is drawn into the compressor 111.

Refrigerant flowing through the fixed throttle 130*k* flows through the branch passage 118*a* and flows into the second evaporator 119. Then, the refrigerant exerts a cooling capacity in the second evaporator 119 and flows through the branch passage 118*b* and is drawn by the ejector 130 from the refrigerant suction port 130*d* of the ejector 130. Then, the refrigerant is mixed with liquid-phase refrigerant flowing through the nozzle portion 130*b* in the mixing portion 130*j* and then flows into the first evaporator 116.

As described above, just as with the 18th embodiment, also in this embodiment, it is possible to perform cooling operation in the first evaporator 116 and the second evaporator 119 at the same time and to reduce the evaporation pressure of refrigerant of the second evaporator 119 as compared with the evaporation pressure of refrigerant of the first evaporator 116. Moreover, it is possible to reduce the amount of compression work of the compressor 111 and to produce the effect of saving power.

Moreover, in this embodiment, the variable nozzle portion that reduces the pressure of refrigerant jetting out of the refrigerant jet port 130*h* of the ejector 130 to control the flow rate of refrigerant, and the fixed throttle 130*k* that reduces the pressure of refrigerant flowing through the branch refrigerant outlet 130*e* to control the flow rate of refrigerant are integrated into the ejector 130. Hence, this eliminates the need for arranging a fixed throttle that reduces the pressure of refrigerant in the branch passage 118 and hence can reduce the size of the ejector cycle device.

Furthermore, the flow rate of refrigerant flowing through the variable nozzle portion is changed by the needle 132*a* and the driving part 132*b* to control the ratio of flow rate between the evaporators 116, 119. Hence, it is possible to exert a high cooling capacity in the whole cycle by a simple construction.

20th Embodiment

The ejector 114 of the 18th embodiment reduces the pressure of refrigerant jetting out of the refrigerant jet port 114*h* of the ejector 114 by the nozzle portion 114*b* and the needle 115*a* to control the flow rate thereof, and reduces the pressure of refrigerant flowing out of the branch refrigerant outflow port 114*e* to the branch passage 118*a* to control the flow rate thereof. However, in this 20th embodiment, the ejector 114 is eliminated and an ejector 140 is arranged. This embodiment is the same in the other points as the 18th embodiment.

Figure 27:
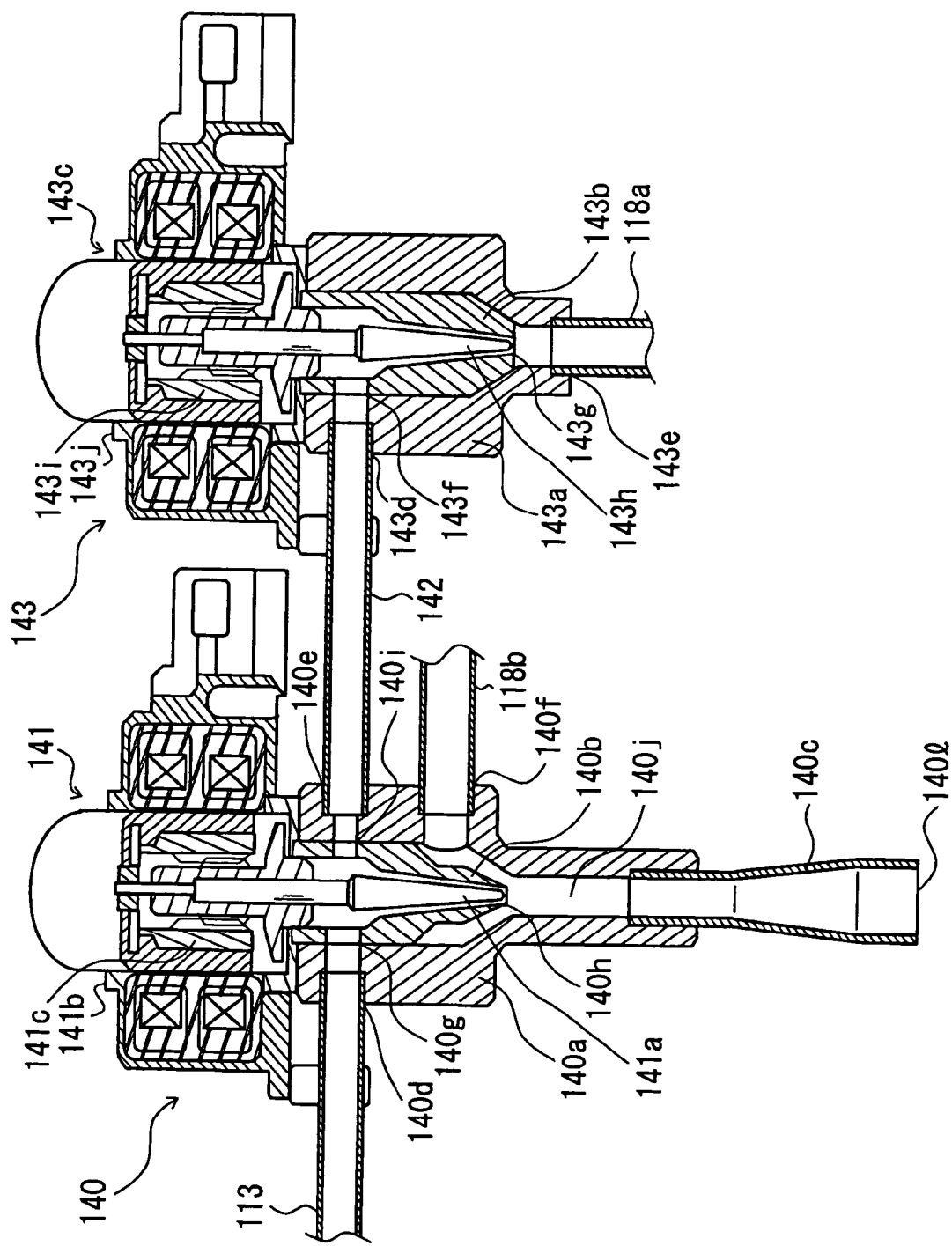
FIG. 27 is a schematic cross-sectional view of an ejector of a 20th embodiment of the present invention.

Describing the ejector 140 of the 20th embodiment with reference to FIG. 27, the ejector 140 is constructed of a housing 140*a*, a nozzle portion 140*b*, a diffuser portion 140*c*, a passage area controlling mechanism 141, a coupling pipe 142, and a variable throttle mechanism 143.

The housing 140*a*, just as with the 19th embodiment, has a refrigerant inflow port 140*d* (a first connection portion) and a refrigerant suction port 140*f* (a third connection portion). Further, the housing 140*a* has a coupling pipe outflow port 140*e* that flows out refrigerant flowing in from the refrigerant inflow port 140*d* to the coupling pipe 142. A refrigerant pipe 113 is coupled to the refrigerant inflow port 140*d*, a branch passage 118*b* is coupled to the refrigerant suction port 140*f*, and the coupling pipe 142 is coupled to the throttle mechanism outflow port 140*e*.

The nozzle portion 140*b*, just as with the 19th embodiment, has a refrigerant inflow port 140*g* and a refrigerant jet port 140*h*. Further, the nozzle portion 140*b* has a coupling pipe outflow port 140*i* that causes the inside of the nozzle portion 140*b* to communicate with the coupling pipe outflow port 140*e*. This coupling pipe outflow port 140*i* is arranged at a position where the flow rate of refrigerant flowing out of the coupling pipe outflow port 140*e* is not changed by the passage area controlling mechanism 141.

Moreover, the diffuser portion 140*c* and the passage area controlling mechanism 141 are constructed in the same manner as the 19th embodiment. The passage area controlling mechanism 141 is constructed of a needle 141*a*, a driving part 141*b*, and the rotor 141*c*.

The coupling pipe 142 is a refrigerant pipe that connects the coupling pipe outflow port 140*e* to a coupling pipe inflow port 143*d* to be described later and has a length of about 5 cm or less, for example.

Next, a variable throttle mechanism 143 is constructed of a variable throttle housing 143*a*, a throttle portion 143*b*, and a passage area controlling mechanism 143*c*. The variable throttle housing 143*a* has a coupling pipe inflow port 143*d*, which flows out refrigerant flowing out of the coupling pipe 142 into the variable throttle mechanism 143, and a branch refrigerant outflow port 143*e* (a fourth connection portion) that flows out refrigerant flowing in from the coupling pipe inflow port 143*d* to the branch passage 18*a*.

The coupling pipe 142 is coupled to the coupling pipe inflow port 143*d*, and the branch passage 118*b* is coupled to the branch refrigerant outflow port 143*e* and their coupling portions are bonded by brazing so as to prevent a leakage of refrigerant.

The throttle portion 143*b* has a refrigerant inflow port 143*f*, which causes the coupling pipe inflow port 143*d* to communicate with the inside of the throttle portion 143*b* and flows refrigerant into the throttle portion 143*b*, and a refrigerant pressure reducing port 143*g*, which reduces the pressure of refrigerant flowing into the throttle portion 143*b* from the refrigerant inflow port 143*f* to expand the refrigerant.

The passage area controlling mechanism 143*c*, just as with the passage area controlling mechanism 141, is constructed of a needle 143*h*, a driving part 143*i*, and a rotor 143*j*. The passage area controlling mechanism 143*c* changes the flow rate of refrigerant flowing through the refrigerant pressure reducing port 143*g* by moving the needle 143*h* to reduce the pressure of refrigerant to thereby expand the refrigerant.

Here, the ejector 140 and the passage area controlling mechanism 141 are combined with each other as an integrated structure. The housing 140*a* of the ejector 140 and the variable throttle housing 143*a* of the variable throttle mechanism 143 are integrally coupled with each other by a coupling pipe 142 having a length of 5 cm or less in a state where they cannot be separated. The housing 140, the coupling pipe 142, and the variable throttle housing 143*a* may be coupled with each other by screws via a sealing member and the like in a state where they can be separated.

Describing the operation of this embodiment having this construction, just as with the 18th embodiment, refrigerant discharged from the compressor 111 is cooled by the radiator 112 and flows into the ejector 140 from the refrigerant inflow port 140*d* of the ejector 140. The refrigerant flowing into the ejector 140 is branched on the upstream side of the refrigerant jet port 140*h* of the nozzle portion 140*b*, into refrigerant flowing into the coupling pipe 142 and refrigerant jetting from the refrigerant jet port 140*h*. The refrigerant flowing into the coupling pipe 142 flows into the throttle portion 143*b* of the variable throttle mechanism 143.

The air conditioning control unit 122 computes the degree of superheat of refrigerant at the outlet of the second evaporator 119 on the basis of the detection value Ts2 of the temperature sensor 123 and the detection value Ps2 of the pressure sensor 124. Then, the air conditioning control unit 122 controls the flow rate of refrigerant of the variable throttle mechanism 143 constructed integrally with the ejector 140 in such a way as to bring the degree of superheat to within a specified range. Specifically, the air conditioning control unit 122 outputs a control signal to the driving part 143*j* to move the needle 143*h* so as to change the flow rate of refrigerant flowing through the refrigerant pressure reducing port 143*g*.

Further, just as with the 19th embodiment, the air conditioning control unit 122 changes the flow rate of refrigerant jetted from the refrigerant jet port 140*h* of the ejector 140 in such a manner that the ratio of flow rate between the evaporators 116, 119 can exert a high cooling capacity as the whole cycle.

As described above, the air conditioning control unit 122 determines the flow rate of refrigerant of the refrigerant pressure reducing port 143*g* of the variable throttle mechanism 143 and the flow rate of refrigerant jetted out of the refrigerant jet port 140*h* of the nozzle portion 140*b*, so that refrigerant flowing through the nozzle portion 140*b* exerts a high cooling capacity in the first evaporator 116. The refrigerant flowing out of the first evaporator 116 is again drawn by the compressor 111. The refrigerant flowing through the refrigerant pressure reducing port 143*g* and flowing out into the branch passage 118*a* exerts a cooling capacity in the second evaporator 119 and then is drawn by the refrigerant suction port 140*f* of the ejector 140 via the branch passage 118*b*.

Even in this construction, just as with the 18th embodiment, it is possible to perform cooling actions at the same time in the first evaporator 116 and the second evaporator 119. Further, it is possible to reduce the evaporation pressure of refrigerant of the second evaporator 119 as compared with the evaporation pressure of refrigerant of the first evaporator 116. Moreover, it is possible to reduce the amount of compression work of the compressor 111 and to produce the effect of saving power.

Moreover, in this embodiment, the variable throttle mechanism 143 is integrated with the ejector 140. Hence, this eliminates the need for arranging a throttle mechanism in the branch passage 118 and hence can reduce the size and weight of the ejector cycle device.

Furthermore, in this embodiment, it is possible to individually change the flow rate of refrigerant flowing through the variable nozzle portion and the flow rate of refrigerant flowing through the variable throttle mechanism 143. Hence, it is possible to individually control the flow rate of refrigerant flowing through the nozzle portion 140*b* and flowing into the first evaporator 116 and the flow rate of refrigerant flowing through the branch passage 118 and flowing into the second evaporator 119. Therefore, it is possible to exert a high cooling capacity as the whole cycle.

Other Embodiments

The present invention is not limited to the above-mentioned embodiments but can be modified variously in the following manner.

In the 19th embodiment, the ejector 130 having the variable nozzle portion 130*b* and the fixed throttle 130*k* are used. However, even when an ejector in which the area of refrigerant passage of the nozzle portion is fixed and which has a variable throttle mechanism for reducing the pressure of refrigerant flowing out to the branch passage 118a is used, it is possible to produce the same effect as the

19th Embodiment

In the 20th embodiment, the driving part 141b of the variable nozzle portion 140b and the driving part 143j of the variable throttle mechanism 143 are constructed separately. However, the needle 141a of the variable nozzle portion 140b and the needle 143h of the variable throttle mechanism 143 can be coupled to each other and two needles 141a, 143a can be controlled by a single driving part.

In the 18th to 20th embodiments, an example has been described in which the first evaporator 116 is used for air conditioning for the vehicle compartment and in which the second evaporator 119 is used for the refrigerator for the vehicle. However, the space to be cooled by the first evaporator 116 may be the same as the space to be cooled by the second evaporator 119.

In the 18th to 20th embodiments, the variable displacement compressor is used as the compressor 111, but a fixed displacement compressor or an electrically driven compressor may be used as the compressor 111. Furthermore, in the case of the fixed displacement compressor, it is also recommendable to control a refrigerant discharge capacity by controlling the ratio of an operating state to a non-operating state (rate of operation) by an electromagnetic clutch. Further, in the case of the electrically driven compressor, it is also recommendable to control a refrigerant discharge capacity by controlling the number of revolutions.

In the 18th to 20th embodiments, the example of a subcritical pressure cycle has been described in which the high pressure of the refrigerating cycle is not higher than the critical pressure of refrigerant, but the present invention may be applied to a supercritical pressure cycle in which the high pressure of the refrigerant cycle is higher than the critical pressure of refrigerant.

In the 18th embodiment, the flow rate of refrigerant is controlled on the basis of the degree of superheat of refrigerant at the outlet of the second evaporator 119. In the 19th embodiment, the flow rate of refrigerant is controlled on the basis of the degree of superheat of refrigerant at the outlet of the first evaporator 116. However, the area of refrigerant passage may be controlled on the basis of the flow rate of refrigerant discharged from the compressor 111, the pressure and temperature of refrigerant at the outlet of the radiator 112, and the degree of supercooling, etc.

For example, in a cycle in which refrigerant has its pressure increased to the state of supercritical pressure by the compressor 111, refrigerant radiating heat in the radiator 112 does not become a liquid phase. Hence, it is necessary only to control the area of passage of refrigerant of the nozzle portion of the ejector and the area of passage of refrigerant of the throttle unit of the branch passage on the basis of the pressure and temperature of refrigerant at the outlet of the radiator 112.

In the 18th to 20th embodiments, the flow control valve driven by a stepping motor may be used as the passage area controlling mechanisms 115, 132, 141 and the variable throttle mechanism 143, but other flow control valve may be used. For example, it is possible to use variable throttle unit that switches for use a plurality of fixed throttles having different characteristics. Moreover, it is also recommendable to use the mechanical variable throttle mechanisms and electric variable throttle mechanisms of the above-mentioned respective embodiments in combination.

Figure 28:
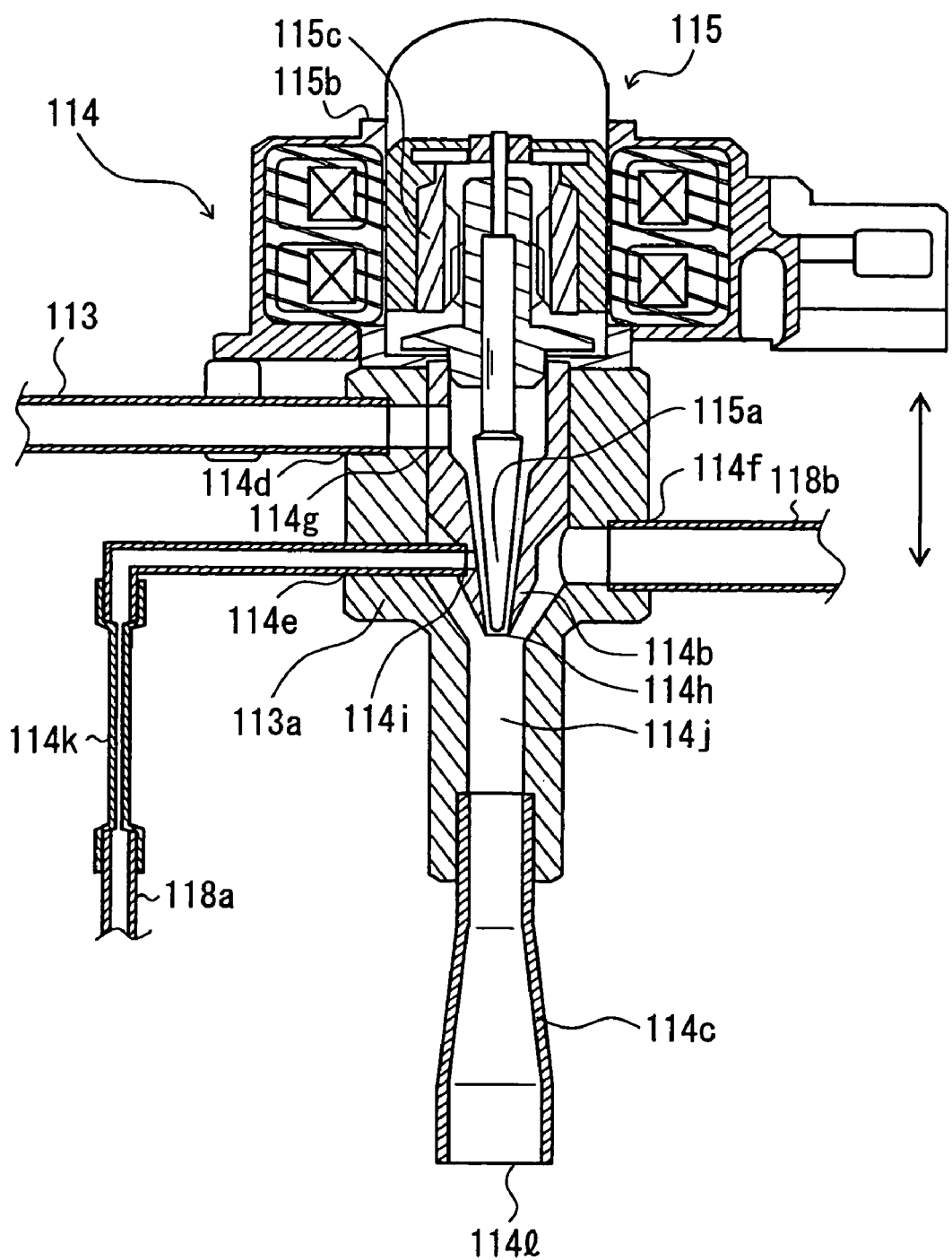
FIG. 28 is a schematic cross-sectional view in which a fixed throttle is added to an ejector of a modification of the 18th embodiment.

For example, as shown in FIG. 28, the ejector 114 of the 18th embodiment may be connected to the branch passage 118a via the fixed throttle 114k. An orifice or a capillary tube can be used as the fixed throttle 114k.

In the 18th to 20th embodiments, the first evaporator 116 and the second evaporator 119 are used, but the number of evaporators may be increased, for example, three or more evaporators may be used. A throttle unit (throttle means) that reduces the pressure of refrigerant supplied to the added evaporator to expand the refrigerant may be integrated with the ejector. According to this, it is possible to further reduce the size and weight of the ejector cycle device.

For example, in the constructions of the 18th to 20th embodiments, a second branch passage for connecting a portion between the outlet of the radiator 112 and the refrigerant inflow port 114d of the ejector 114 to a portion between the outlet of the first evaporator 116 and the accumulator 117 may be arranged. Furthermore, a throttle unit (throttle means) and a third evaporator may be arranged in the second branch passage, and the throttle unit arranged in the second branch passage may be integrated with the ejector 114.

In the above-mentioned embodiments, the ejector and the ejector cycle device in accordance with the present invention are applied to an air conditioning unit for a vehicle. However, the ejector and the ejector cycle device in accordance with the present invention may be applied to a heat pump cycle for a refrigerator for a vehicle, a stationary refrigerator, a stationary freezer, an air cooling unit, and a water heater.

In the above-mentioned embodiments, Freon-based refrigerant, a carbon dioxide ($CO_2$)-based refrigerant or a hydrocarbon (HC)-based refrigerant may be used as refrigerant. Here, the term of Freon means a generic term of an organic compound containing carbon, fluorine, chlorine, and hydrogen and the Freon is widely used as refrigerant.

The Freon-based refrigerant includes an HCFC (hydrochlorofluorocarbon)-based refrigerant and an HFC (hydrofluorocarbon)-based refrigerant and is refrigerant called an alternative for Freon because it does not deplete an ozone layer.

Moreover, the HC (hydrocarbon)-based refrigerant is a refrigerant substance containing hydrogen and carbon and existing in nature. This HC-based refrigerant includes R600a (isobutene) and R290 (propane).

Such changes and modifications are to be understood as being within the scope of the present invention as defined by the appended claims.

What is claimed is:

1. An ejector cycle device comprising:
    a compressor drawing and compressing refrigerant;
    a radiator radiating heat of high-pressure refrigerant discharged from the compressor;
    an ejector which includes a nozzle portion converting a pressure energy of high-pressure refrigerant on a downstream side of the radiator to a velocity energy to decompress and expand refrigerant, and a suction port for drawing refrigerant by a jet flow from the nozzle portion;
    a branch portion separating the refrigerant flow from a refrigerant passage from the radiator into an ejector passage coupled directly to the nozzle portion of the ejector; and a branch passage coupled to the suction port of the ejector;
    a throttle unit arranged in the branch passage, the throttle unit decompressing refrigerant;
    an evaporator arranged on a downstream side of refrigerant flow of the throttle unit in the branch passage, the evaporator evaporating refrigerant; and
    a flow control unit arranged in the refrigerant passage between the radiator and the ejector, the flow control unit controlling a flow rate of refrigerant.

2. The ejector cycle device according to claim 1, wherein
the branch passage is branched from the refrigerant passage at the branch portion between the radiator and the nozzle portion, and
the flow control unit is located between the radiator and the branch portion.

3. The ejector cycle device according to claim 2, wherein the flow control unit is a flow control valve controlling a total flow amount of the refrigerant before being branched.

4. The ejector cycle device according to claim 3, wherein the flow control valve controls the total flow amount of the refrigerant before being branched, without changing a ratio between a flow amount of refrigerant jetted from the nozzle portion and a flow amount of refrigerant drawn into the suction port.

5. The ejector cycle device according to claim 1, wherein refrigerant simultaneously flows through the nozzle portion of the ejector and the throttle unit in the branch passage.

6. The ejector cycle device according to claim 1, wherein the branch passage is branched from the branch portion in the refrigerator passage between the radiator and the nozzle portion of the ejector, the refrigerant branched at the branch portion simultaneously flows through the nozzle portion of the ejector and through the branch passage from the branch portion to the suction port through the throttle unit and the evaporator in this order.

7. The ejector cycle device according to claim 6, wherein the branch passage provided with the throttle unit and the evaporator is a single passage only connected to the branch portion and the suction port such that the refrigerant flowing through the branch passage is only from the branch portion.

8. The ejector cycle device according to claim 1, wherein the ejector passage extends in a single straight line between the branch portion and the nozzle portion of the ejector.

9. The ejector cycle device according to claim 1, wherein the refrigerant flows along an axial line through the nozzle portion of the ejector, the ejector passage extending in a single straight line between the branch portion and the nozzle portion of the ejector, the single straight line being co-linear with the axial line through the nozzle portion of the ejector.

10. An ejector cycle device comprising:
a compressor drawing and compressing refrigerant;
a radiator radiating heat of high-pressure refrigerant discharged from the compressor;
an ejector which includes a nozzle portion converting a pressure energy of high-pressure refrigerant on a downstream side of the radiator to a velocity energy to decompress and expand refrigerant, and a suction port for drawing refrigerant by a jet flow from the nozzle portion;
a branch portion separating the refrigerant flow from the radiator into an ejector passage coupled directly to the nozzle portion of the ejector; and a branch passage coupled to the suction port of the ejector;
a throttle unit arranged in the branch passage, the throttle unit decompressing refrigerant;
an evaporator arranged on a downstream side of refrigerant flow of the throttle unit in the branch passage, the evaporator evaporating refrigerant; and
a vapor/liquid separator located between an outlet of the ejector and the compressor, the vapor/liquid separator separating refrigerant into vapor-phase refrigerant and liquid-phase refrigerant so as to supply the vapor-phase refrigerant to the compressor and to accumulate the liquid-phase refrigerant.

11. The ejector cycle device according to claim 10, further comprising
a heat recovery unit located between the vapor/liquid separator and the compressor, the heat recovery unit exchanging heat between refrigerant flowing out of the radiator and refrigerant flowing out of the vapor/liquid separator and drawn by the compressor.

12. The ejector cycle device according to claim 10, further comprising
a heat recovery unit located between the ejector and the vapor/liquid separator, the heat recovery unit exchanging heat between refrigerant flowing out of the radiator and refrigerant flowing out of the ejector and flowing into the vapor/liquid separator.

13. The ejector cycle device according to claim 10, further comprising
a plurality of heat recovery members located between the ejector and the compressor, the plurality of heat recovery members exchanging heat between refrigerant flowing out of the radiator and refrigerant flowing out of the ejector and drawn by the compressor, wherein the vapor/liquid separator is located between two of the heat recovery members.

14. The ejector cycle device according to claim 10, further comprising:
a liquid refrigerant supply passage drawing liquid-phase refrigerant from the vapor/liquid separator; and
means for allowing a refrigerant flow in a direction flowing out of the vapor/liquid separator, the allowing means being arranged in the liquid refrigerant supply passage,
wherein the liquid-phase refrigerant supplied from the liquid refrigerant supply passage is made to flow into an upstream side of refrigerant flow of the evaporator.

15. The ejector cycle device according to claim 14, wherein the ejector is a variable ejector having a variable throttle mechanism capable of controlling a flow rate of refrigerant.

16. An ejector cycle device comprising:
a compressor drawing and compressing refrigerant;
a radiator radiating heat of high-pressure refrigerant discharged from the compressor;
an ejector which includes a nozzle portion converting a pressure energy of high-pressure refrigerant on a downstream side of the radiator to a velocity energy to decompress and expand refrigerant, and a suction port for drawing refrigerant by a jet flow from the nozzle portion;
a branch portion separating the refrigerant flow from the radiator into an ejector passage coupled directly to the nozzle portion of the ejector; and a branch passage coupled to the suction port of the ejector;
a throttle unit arranged in the branch passage, the throttle unit decompressing refrigerant;
an evaporator arranged on a downstream side of refrigerant flow of the throttle unit in the branch passage, the evaporator evaporating refrigerant; and
a heat recovery unit located between the ejector and the compressor, the heat recovery unit exchanging heat between refrigerant flowing out of the radiator and refrigerant flowing out of the ejector and drawn by the compressor.

17. The ejector cycle device according to claim 16, wherein refrigerant flowing into the branch passage is used as refrigerant flowing through the heat recovery unit and flowing out of the radiator.

18. An ejector cycle device comprising:
a compressor drawing and compressing refrigerant;
a radiator radiating heat of high-pressure refrigerant discharged from the compressor;
an ejector which includes a nozzle portion converting a pressure energy of high-pressure refrigerant on a downstream side of the radiator to a velocity energy to decompress and expand refrigerant, and a suction port for drawing refrigerant by a jet flow from the nozzle portion;

a branch portion separating the refrigerant flow from the radiator into an ejector passage coupled directly to the nozzle portion of the ejector; and a branch passage coupled to the suction port of the ejector;

a throttle unit arranged in the branch passage, the throttle unit decompressing refrigerant;

an evaporator arranged on a downstream side of refrigerant flow of the throttle unit in the branch passage, the evaporator evaporating refrigerant; and a vapor/liquid separator located between the ejector and the compressor; and a heat recovery unit that has a first refrigerant passage through which refrigerant flows from the radiator into the branch passage, and a second refrigerant passage through which the vapor-phase refrigerant flowing out of the vapor/liquid separator is drawn into the compressor.

19. An ejector cycle device comprising:

an ejector that includes a nozzle portion reducing pressure of refrigerant to thereby expand the refrigerant, the ejector drawing refrigerant by high-velocity refrigerant jetted from the nozzle portion;

an evaporator evaporating refrigerant branched from a branch passage branched from a refrigerant passage disposed on an upstream side of the nozzle portion and drawn by the ejector; and throttle means for reducing pressure of refrigerant branched from the upstream side of the nozzle portion to thereby expand the refrigerant and supply the refrigerant to the evaporator; wherein the throttle means is integrated with the ejector;

a branch portion of the branch passage is located in a housing of the ejector; and a refrigerant flow is branched at the branch portion into a first stream flowing into the nozzle portion and a second stream flowing into the throttle means.

20. The ejector cycle device according to claim 19, wherein refrigerant simultaneously flows through the nozzle portion of the ejector and the throttle means.

21. The ejector cycle device according to claim 19, wherein the branch passage is branched from the branch portion in the refrigerator passage on the upstream side of the nozzle portion of the ejector, the refrigerant branched at the branch portion simultaneously flows through the nozzle portion of the ejector and through the branch passage from the branch portion through the throttle unit and the evaporator in this order.

* * * * *